(12) United States Patent
Kashi

(10) Patent No.: US 7,797,630 B2
(45) Date of Patent: Sep. 14, 2010

(54) METHOD FOR STORING AND RETRIEVING DIGITAL INK CALL LOGS

(75) Inventor: Ramanujan Kashi, Magarpatta (IN)

(73) Assignee: Avaya Inc., Basking Ridge, NJ (US)

( * ) Notice: Subject to any disclaimer, the term of this patent is extended or adjusted under 35 U.S.C. 154(b) by 1342 days.

(21) Appl. No.: 11/221,100

(22) Filed: Sep. 7, 2005

(65) Prior Publication Data

US 2006/0010368 A1    Jan. 12, 2006

Related U.S. Application Data

(63) Continuation-in-part of application No. 10/877,004, filed on Jun. 24, 2004, now Pat. No. 7,284,192.

(51) Int. Cl.
*G06F 17/00* (2006.01)
(52) U.S. Cl. ........................ 715/268; 715/205
(58) Field of Classification Search ................ 715/268, 715/330, 331, 332, 230, 231, 205
See application file for complete search history.

(56) References Cited

U.S. PATENT DOCUMENTS

| 6,282,284 | B1 * | 8/2001 | Dezonno et al. | 379/265.09 |
| 6,549,675 | B2 | 4/2003 | Chatterjee | |
| 6,681,045 | B1 | 1/2004 | Lapstun | |
| 6,834,048 | B1 * | 12/2004 | Cho et al. | 370/356 |

(Continued)

FOREIGN PATENT DOCUMENTS

EP    1 016 983    7/2000

OTHER PUBLICATIONS

Olsen et al., ScreenCrayons: Annotating Anything, ACM 2004, pp. 165-174.*

(Continued)

*Primary Examiner*—Cong-Lac Huynh
(74) *Attorney, Agent, or Firm*—Cohen Pontani Lieberman & Pavane LLP

(57) ABSTRACT

Digital ink is captured using either a digitizer attached to the serial port of the computer or by a tablet computer having a stylus during the detection, capture, storage and association of ink with particular types of information. An ink log stores handwritten notes that are generated during a phone call. Whenever a call is made or received via a regular telephone or an IP Softphone, the number being dialed or that the call is being received from is used in a search to locate a file associated with this number within an ink log. If a file associated with the called or dialed number exists, then the file is retrieved and all prior ink notes associated with this number, including their time stamps, are displayed in a window that is opened. If a file corresponding to the called or dialed number is not present in the ink log, then a new file is created along with an associated blank window, whereby the user can begin "inking" into this file. Alternatively, a user may highlight a phone number and view the InkLog for the particular number. Upon a user selecting a View Ink Log category, the ink log is accessed and all notes, drawings, etc. that a user generated in all previous calls that where either made to the number or calls received from this number are displayed.

26 Claims, 23 Drawing Sheets

U.S. PATENT DOCUMENTS

| | | | |
|---|---|---|---|
| 6,845,102 B1* | 1/2005 | Bendelac et al. | 370/401 |
| 6,859,810 B2 | 2/2005 | Andrei et al. | |
| 6,870,828 B1* | 3/2005 | Giordano, III | 370/352 |
| 6,938,067 B2* | 8/2005 | Hershenson | 709/202 |
| 2002/0031243 A1* | 3/2002 | Schiller et al. | 382/119 |
| 2003/0018668 A1 | 1/2003 | Britton et al. | |
| 2003/0065645 A1 | 4/2003 | Itoh et al. | |
| 2003/0094500 A1 | 5/2003 | Paul | |
| 2003/0101414 A1 | 5/2003 | Liu | |
| 2003/0103239 A1 | 6/2003 | Silverbrook | |
| 2003/0117379 A1 | 6/2003 | Carro | |
| 2003/0135647 A1* | 7/2003 | Himmel et al. | 709/245 |
| 2003/0142072 A1 | 7/2003 | Lapstun | |
| 2003/0163525 A1 | 8/2003 | Hendriks | |
| 2003/0195820 A1 | 10/2003 | Silverbrook | |
| 2003/0208473 A1 | 11/2003 | Lennon | |
| 2003/0214553 A1 | 11/2003 | Dodge | |
| 2003/0215138 A1 | 11/2003 | Raghupathy | |
| 2003/0215139 A1 | 11/2003 | Shilman | |
| 2003/0215145 A1 | 11/2003 | Shilman | |
| 2003/0217336 A1 | 11/2003 | Gounares | |
| 2004/0122951 A1* | 6/2004 | Beck et al. | 709/227 |
| 2004/0172595 A1 | 9/2004 | Lerner et al. | |
| 2004/0194021 A1 | 9/2004 | Marshall et al. | |
| 2004/0205501 A1 | 10/2004 | Gupta | |
| 2004/0205541 A1 | 10/2004 | D'Amico | |
| 2004/0205545 A1* | 10/2004 | Bargeron et al. | 715/512 |
| 2004/0210833 A1 | 10/2004 | Lerner et al. | |
| 2004/0243939 A1* | 12/2004 | Perepa et al. | 715/739 |
| 2004/0252888 A1 | 12/2004 | Bargeron et al. | |
| 2005/0050086 A1 | 3/2005 | Liu et al. | |
| 2005/0089237 A1 | 4/2005 | Park et al. | |
| 2005/0097189 A1* | 5/2005 | Kashi | 709/217 |
| 2005/0117737 A1* | 6/2005 | Stanford et al. | 379/387.01 |
| 2005/0122997 A1* | 6/2005 | Bendelac et al. | 370/477 |
| 2005/0154707 A1* | 7/2005 | Napper et al. | 707/3 |
| 2005/0163311 A1* | 7/2005 | Fowler et al. | 379/900 |
| 2005/0183005 A1* | 8/2005 | Denoue et al. | 715/512 |
| 2005/0198202 A1 | 9/2005 | Yamamoto | |
| 2008/0183533 A1* | 7/2008 | Raffel et al. | 705/7 |
| 2009/0018912 A1* | 1/2009 | Altberg et al. | 705/14 |
| 2009/0067599 A1* | 3/2009 | Agarwal et al. | 379/114.21 |

OTHER PUBLICATIONS

Norrie et al., Print-n-Link: Weaving the Paper Web, ACM 2006, pp. 34-43.*

Johnston et al., Match: An Architecture for Multimodal Dialogue Systems, Google 2002, pp. 376-383.*

Spoerri, Handwritten Notes as a Visual Interface to Index, Edit and Publish Audio/Video Highlights, Google 2002, pp. 116-130.*

Shilman et al., Recognizing Freeform Digital Ink Annotations, Google 2004, pp. 322-331.*

Ramachandran et al. "An Architecture for Ink Annotations on Web Documents" Proceedings Of The Seventh International Conference On Document Analysis Ad Recognition (ICDAR '03), 2003.

Bargeron et al.: "Reflowing Digital Ink Annotations" CHI 2003, Apr. 5, 2003, pp. 385-392.

Denoue et al.: "An annotation tool for Web browsers and its applications to information retrieval" Proceedings Of Riao 2000, Sixth Conference on Content Based Multimedia Information Access, Apr. 2000, XP002464192.

Cadiz et al., Using Web Annotations for Asynchronous Collaboration around Documents, ACM 2000, pp. 309-318.

Brush et al., Robust Annotation Positioning in Digital Documents, ACM 2001, pp. 285-292.

Bouvin et al., Fluid Annotations Through Open Hypedrmedia: Using and Extending Emerging Web Standards, ACM 2002, pp. 160-171.

Golovchinsky et al., Moving Markup: Repositioning Freeform Annotations, ACM 2002, pp. 21-29.

http://www.imarkup.com, iMarkup Solutions, iMarkup—Collaboration and Workflow Solutions for Digital Content and Document Management, Jan. 29, 2004.

"What is the Document Object Model?", Nov. 13, 2000, Philippe Le Hégaret et al., pp. 1-6.

Patrick Philippot, Where Did I Read That, PC Magazine, Apr. 9, 2002.

* cited by examiner

The Brainblowing Graphics (Navigation)
...site, great, advanced, imagemaps, graphics, jpeg, gif, IE, Internet, Explorer, Netscape.
Navigator graphic ... animation, gif, text, tender, rendered, rendertime ...
Description: 3D images, and interactive java-driven scenes. Animations are stored in AVI files for download.

Category: Computers > Graphics > Animation www.geocities.com/Athens/Styx/2277/-9k- Cached-Similar pages Microsoft Security Bulletin MS02-066
... not correctly check the parameters of a PNG graphics file when ... Office product and

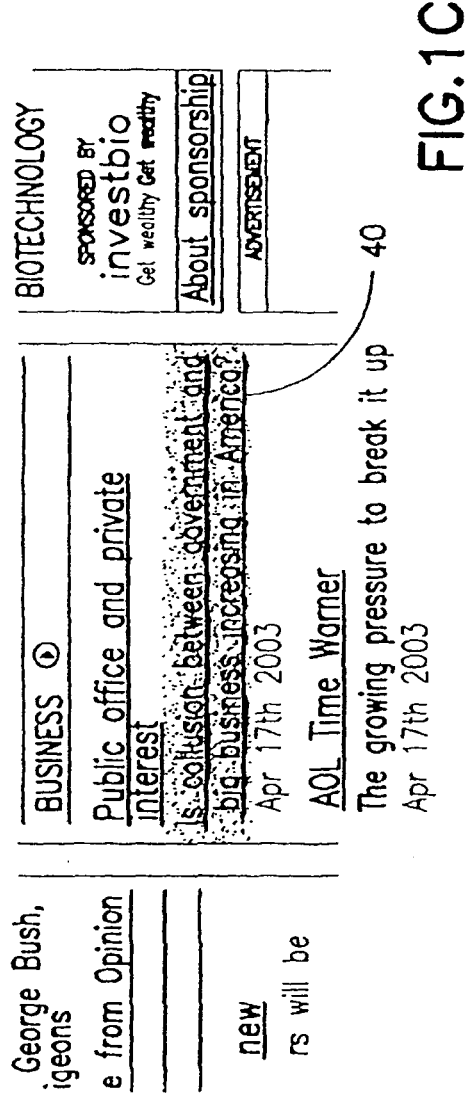

Health
Entertainment
Travel
Education
Special Reports

Get up to $50 Back!

SERVICES
Video
Newswatch
R-Mail Services
CNN To Go
SEARCH CNN.COM: [      ] GO

...and join proposals call for rebuilding the world's tallest building taller even the destroyed towers.

FULL STORY
· Video: A look at the proposals
· Interactive: A gallery of new proposals
· Gallery: History of skyscrapers
· Interactive: World's 10 tallest buildings · Israeli killed in border village attack !* Video
· Bee Gees singer Maurice Gibb dies | Obituary !* Video
· Pete Townshend criticized for entering child porn site BUSINESS at CNNmoney STOCK/FUND QUOTES:
enter symbol [      ] GET
sponsored by: Bank of America MARKETS: 4:30 pm ET 1/10
| | | |
|---|---|---|
| DJIA | ↑ +8.80 | 8784.93 | +0.10% |
| NAS | ↑ +8.80 | 1447.75 | +0.64% |
| S&P | | | unch. |

BUSINESS NEWS ▲

TRY • TIME RISK-FREE & GET A FREE GIFT!

BREAKING NEWS ALERTS • SIGN UP

U.S. NEWS ▲

WORLD
· Man stabbed in NY subway station
· Search for missing woman continues

WORLD NEWS ▲

ON THE SCENE
Eason Jordan on North Korea

U.S. NEWS ▲

U.S.
· Man stabbed in NY subway station
· Search for missing woman continues

| FIG.6B-1 |
|---|
| FIG.6B-2 |

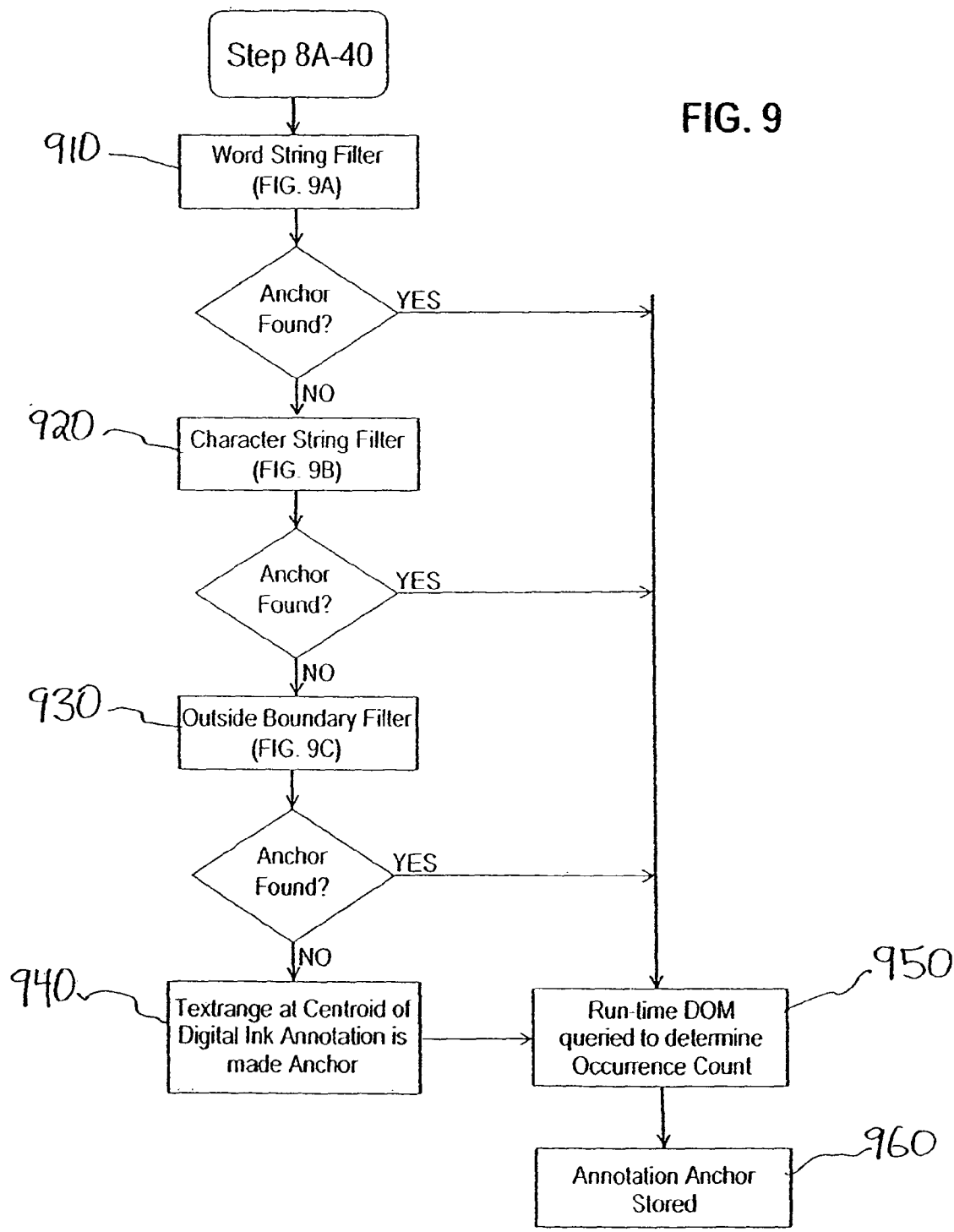

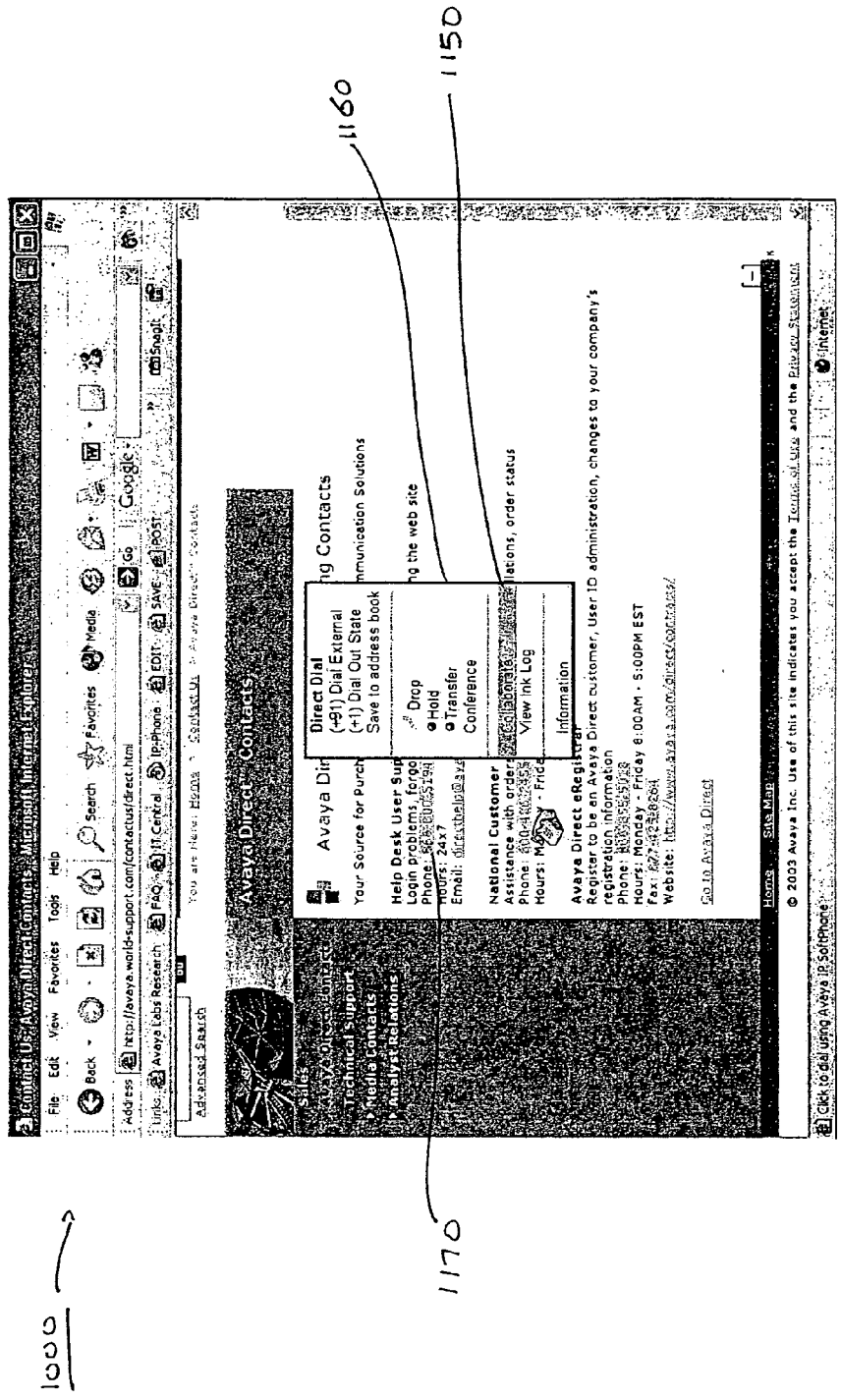

METHOD FOR STORING AND RETRIEVING DIGITAL INK CALL LOGS

CROSS REFERENCE TO RELATED APPLICATION

This application is a continuation-in-part of U.S. patent application Ser. No. 10/877,004 which was filed with the U.S. Patent and Trademark Office on Jun. 24, 2004 now U.S. Pat. No. 7,284,192, and which is hereby incorporated by reference in its entirety.

BACKGROUND OF THE INVENTION

1. Field of the Invention

The present invention relates generally to browsers and browser functionality, and, specifically, to an architecture and method for capturing, storing, streaming and associating ink with elements on web pages using digital ink.

2. Description of the Related Art

The technology of computing and the technology of communication have been going through a process of merging together—a process in which the distinctions between the technologies of the telephone, the television, the personal computer, the Internet, and the cellular phone are increasingly blurred, if not meaningless. The functionalities of what were once separate devices are now freely shared between and among devices. One's cellular phone can surf the Internet, while one's personal computer (PC) can make telephone calls. Part of this synergistic merging and growth of technology is the rapidly expanding use of the "browser" for accessing any type of data, or performing any type of activity.

The public was introduced to the "web browser" in the form of Netscape Navigator™ in the mid-1990's. The ancestor of the Netscape Navigator™ was the NCSA Mosaic, a form of "browser" originally used by academics and researchers as a convenient way to present and share information. At that point, the web browser was basically a relatively small program one could run on one's PC that made the accessing and viewing of information and media over a network relatively easy (and even pleasant). With the establishment of a common format (HTML—Hypertext Markup Language) and communication protocol (HTTP—Hypertext Transport Protocol), anyone could make a "web page" residing on the World Wide Web, a web page that could be transmitted, received, and viewed on any web browser. Web browsers rapidly grew into a new form of entertainment media, as well as a seemingly limitless source of information and, for some, self-expression. The Internet, a vast worldwide collection of computer networks linked together, each network using the IP/TCP (Internet Protocol/Transmission Control Protocol) suite to communicate, experienced exponential growth because of its most popular service—the World Wide Web.

Current web browsers, such as Safari (from Apple), Internet Explorer (from Microsoft), Mozilla, Opera, etc., serve as the gateway for many people to their daily source of news, information, and entertainment. Users "surf the Web", i.e., download data from different sources, by entering URLs (Uniform Resource Locators) that indicate the location of the data source. In this application, URLs are considered in their broadest aspect, as addresses for data sources where the address may indicate a web server on the Internet, a memory location of another PC on a local area network (LAN), or even a driver, program, resource, or memory location within the computer system that is running the web browser. Most web browsers simplify the process of entering the URL by saving "bookmarks" that allow the user to navigate to a desired web page by simply clicking the bookmark. In addition, a user may click on a hyperlink embedded in a web page in the web browser in order to navigate to another web page.

As stated above, web pages are transmitted and received using HTTP, while the web pages themselves are written in HTML. The "hypertext" in HTML refers to the content of web pages—more than mere text, hypertext (sometimes referred to as "hypermedia") informs the web browser how to rebuild the web page, and provides for hyperlinks to other web pages, as well as pointers to other resources. HTML is a "markup" language because it describes how documents are to be formatted. Although all web pages are written in a version of HTML (or other similar markup languages), the user never sees the HTML, but only the results of the HTML instructions. For example, the HTML in a web page may instruct the web browser to retrieve a particular photograph stored at a particular location, and show the photograph in the lower left-hand corner of the web page. The user, on the other hand, only sees the photograph in the lower left-hand corner.

As mentioned above, web browsers are undergoing a transformation from being a means for browsing web pages on the World Wide Web to a means for accessing practically any type of data contained in any type of storage location accessible by the browser. On a mundane level, this can be seen in new versions of popular computer operation systems, such as Microsoft Windows, where the resources on the computer are "browsed" using Windows Explorer, which behaves essentially as a browser (i.e., it uses the same control features: "back" and "forward" buttons, hyperlinks, etc.), or at large corporations where employees access company information, reports, and databases using their web browsers on the corporation's intranet.

On a more elevated level, the transformation of browsers can be seen in the planned growth from HTML to XHTML, in which HTML becomes just a variant of XML (extensible Markup Language). A simple way to understand the difference between the two markup languages is that HTML was designed to display data and focus on how data looks, whereas XML was designed to describe data and focus on what data is. The two markup languages are not opposed, but complementary. XML is a universal storage format for data, any type of data, and files stored in XML can be ported between different hardware, software, and programming languages. The expectation is that most database records will be translated into XML format in the coming years.

In the future, browsers will become universal portals into any type of stored data, including any form of communication and/or entertainment. And, as mentioned above, as technologies merge, browsers will be used more and more as the means for interacting with our devices, tools, and each other. Therefore, there is a need for systems and methods that can aid in this merging of technologies; and, in particular, systems and methods that help the browser user interact seamlessly with the browser and, through the browser, with any devices and/or technologies connected to the computer system on which the browser is running. The present application should be read in this light, i.e., although 'web' browsers and 'web' documents are discussed herein, these are exemplary embodiments, and the present invention is intended to apply to any type of browser technology, running on any type of device or combination of devices.

In this progression towards a completely digital environment (i.e., an environment where people relate to media, data, and devices through browsers), many of the traditional means for interacting with paper documents are being emulated on browsers showing digital documents. For example, human beings have used pencils or pens to mark up paper documents for hundreds of years, to the extent that it has become one of the most intuitive means by which human beings interact with data. The acts of jotting down notes in the margin of a document, underlining textual material in a book, circling text or images (or portions thereof) in a magazine, or sketching out diagrams in the white space on a memo from a colleague—all the various forms of annotating data in paper form—are second nature to most. The capability of interacting with digital data with this same ease is both desirable and necessary in a completely digital environment.

This application will focus on the realization of this ink/pen annotation functionality in a browser that accesses digital data. The terms "ink annotation" and "pen annotation" will be used herein to refer to this functionality in a digital environment, even though such functionality may be implemented using input devices that, of course, do not use ink and/or using input devices that may not resemble a pen in any way (such as a mouse, a touchpad, or even a microphone receiving voice commands). Furthermore, the word "ink" will be used as a noun or verb referring to the appearance of a drawn line or shape as reproduced in a browser graphical user interface (GUI).

Examples of digital ink annotation are shown in FIGS. 1A-1E. FIG. 1A shows an example of a digital ink annotation in the form of a freeform sketch on a digital document. Specifically, a portion of a digital document, in this case, a web page, consists of an article comprising text 10 and a photograph 20. The user has underlined some 11 of the text 10, and has drawn a line from the underlined text to a circled portion 21 of the photograph 20. FIG. 1B shows an example of a digital ink annotation in the form of a margin annotation; specifically, a line 30 indicating some text. FIG. 1C shows an example of a digital ink annotation in the form of an underlined annotation 40 of text. FIG. 1D shows an example of a digital ink annotation in the form of an enclosure annotation; specifically, a line 50 forms a circle around some text. FIG. 1E shows an example of a digital ink annotation in the form of handwritten notes in the white space; specifically, the comment "See, Good Ads" 60 is written next to some text on a web page.

The possibilities for digital ink annotation extend beyond the mere emulation of annotations as made by pen or pencil on paper. Because digital ink annotations are stored as digital data, which can be easily modified or otherwise manipulated, a system for digital ink annotation could provide the ability to add, move, or delete any digital annotation at will. The various characteristics and attributes of a digital ink annotation (such as color, size, text, and visibility) could also be readily modified. Furthermore, these digital ink annotations could be hyperlinked—linked to pages in image documents, to other files on the user's system, to Universal Resource Locators (URLs) on the World Wide Web, or to other annotations, whether in ink or not.

In the past, there was a lack of appropriate technology to realize effective digital ink or pen annotation. For example, the standard physical interface for personal computers, the mouse, was not a convenient input device for digital annotations. In addition to the lack of hardware, there was also a lack of software, such as appropriate graphical user interfaces (GUIs), architectures, and software tools. Now appropriate hardware is readily available, such as touch-sensitive screens or stylus and touchpad input systems. On the other hand, although there are now software systems for digital ink annotation, there is still a lack of appropriate software for realizing a comprehensive ink annotation and manipulation framework for browsers.

Current digital annotation systems range from straightforward architectures that personalize web pages with simple locally stored annotations to complex collaboration systems involving multiple servers and clients (e.g., discussion servers). These existing systems offer various annotation capabilities, such as highlighting text within a web document, adding popup notes at certain points, and/or creating annotated links to other resources. See, e.g., the Webhighlighter project as described in P. Phillippot, "Where Did I Read That?" PC magazine, Apr. 9, 2002; L. Denoue and L. Vignollet, "An annotation tool for Web Browsers and its applications to information retrieval" in *Proc. of RIAO* 2000, Paris, April 2000; and A. Phelps and R. Wilensky, "Multivalent Annotations" in *Proc. of First European Conference on Research and Advanced Technology for Digital Libraries*, Pisa, Italy, September 1997. All of these references are hereby incorporated by reference in their entireties.

However, except for the limited capability of highlighting text, those prior art digital annotation systems do not provide a true digital ink annotation capability in a browser, where the user can draw lines, shapes, marks, handwritten notes, and/or other freeform objects directly on a digital document, and have the drawn digital ink annotation stored in such a way that it can be accurately reproduced by another browser running on another device.

There are some digital annotation systems which offer basic pen functions like rendering static ink on top of an application GUI or a web page, but their support for a general purpose association between a digital ink annotation and the digital document being annotated is minimal. For example, U.S. Pat. Pub. No. 2003/0217336 describes software for emulating ink annotations by a pen when using a stylus with the touch-sensitive surface of a tablet personal computer (PC). However, the described invention is an operating system application programming interface (API) which is used by the operating system to provide input ink to particular programs, it is neither concerned with, nor directed to, the association between the input ink and a digital document as it appears in a browser GUI running on the tablet PC. For another example, the iMarkup server and client system from iMarkup Solutions, Inc. (Vista, Calif.) renders static ink on top of a web page; however, the iMarkup system does not associate the rendered ink with the web page in such a way that changes to the web page will be reflected by corresponding changes to the digital ink annotation. Furthermore, the iMarkup system does not take into account the changes in rendering necessary in reproducing the digital ink annotation in another type of web browser, or in a web browser window which has changed its size or dimensions. See also U.S. Pat. Pub. No. 2003/0215139 which describes the analysis and processing of digital ink at various sizes and orientations; and G. Golovchinsky and L. Denoue, "Moving Markup: Repositioning Freeform Annotations" in *Proc. of SIGCHI*, pages 21-30, 2002. All of these references are hereby incorporated by reference in their entireties.

A general purpose association between a digital ink annotation and the digital document being annotated (hereinafter also referred to as a "general purpose ink association") must take into account the dynamic nature of digital documents as they are being accessed through a browser. Furthermore, a general purpose ink association must address the variations in rendering caused by using different browsers or different devices (e.g., with display screens ranging from pocket-sized to wall-sized). The meaning of digital ink, like real ink, typically depends on its exact position relative to the elements on the digital document it is annotating. A shift in position by a few pixels when re-rendering a digital ink annotation on a digital document in a browser could make the ink annotation awkward, confusing, or meaningless. However, the elements in a digital document, such as a web page, can dynamically change attributes, such as position, shape, and alignment. For example, the layout of a web page may change when rendered (i) after the resizing of the web browser window; (ii) by a different web browser; (iii) by a browser running on a different device (e.g., a PDA versus a PC); (iv) with variations in font size and content; and (v) after a change in style sheet rules. In any of these situations, the digital ink annotation could be rendered out of position relative to the elements on the document. Thus, a general purpose ink association must provide for the optimal re-positioning, or re-rendering, of the digital ink annotation in relation to the relevant elements in the annotated digital document.

There is a need for a general purpose association between the digital ink annotation and the digital document being annotated, where such a general purpose association allows for both the dynamic nature and the rendering variations caused by using different browsers and different devices. Specifically, there is a need for a system and method for robustly capturing and associating digital ink annotations with elements within a digital document, such as a web page, as well as providing efficient, standardized storage for said robust digital ink association.

SUMMARY OF THE INVENTION

The present invention relates to a method for detecting, capturing, storing and streaming ink associated with particular information. An ink log is used to store handwritten notes that are generated during a phone call. Whenever a call is made or received via a regular telephone or an IP Softphone residing on a pc, the number that is being dialed or that the call is being received from is used in a search which is performed to determine whether a file associated with this number exists within the ink log.

If a file associated with the called or dialed number exists, then the file is retrieved and all prior ink notes that were associated with the dialed or called number including their time stamps are displayed to a user in a window. If a file corresponding to the called or dialed number is not present in the ink log, then a new file is created along with an associated blank window, whereby the user can begin "inking" into the new file. In this manner, digital "post-its" are created, and the post-it notes are always associated with the called or dialed number.

Alternatively, a user may click on a highlight a phone number and view the ink log for the particular number. Upon a user selecting the "View Ink Log" category of a pull-down menu, the ink log is accessed and all notes, drawings, etc. that a user generated in all previous calls that where either made to this number or calls received from this number are displayed, for example.

In another aspect of the present invention, multiple users are permitted to communicate not only by voice but also simultaneously by writing on a "whiteboard", i.e., a new screen that is opened for inking. Here, communication is established between two parties, where voice, document and ink are all enabled simultaneously. Here, a pull down menu on the screen is shown when the user has clicked the right mouse button on a highlighted number. In accordance with the invention, the person associated with the highlighted number is permitted to see annotations drawn by the user in real-time. The ink that is generated by the user is available for streaming to the second user at a remote ink enabled location.

In essence, ink information is captured and streamed from one location to another remote location. In addition, ink can be shared between the two parties involved in the phone call in real-time. This is based on the premise that both the parties involved in the call are ink enabled. As a result, once the call has been made, ink drawn by one user is streamed to the other and vice-versa. The transmission is stopped if the call ends. In other embodiments, ink sharing may be performed in contact center applications, where a user can circle or ink portions of a bill or invoice to highlight such portions to a customer service agent, for example, during a call.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The foregoing and other advantages and features of the invention will become more apparent from the detailed description of the preferred embodiments of the invention given below with reference to the accompanying drawings in which:

FIGS. 1A-1E show examples of digital ink annotations;

FIG. 2 is a flowchart showing schematically a general method of capturing, rendering, and understanding digital ink annotations on digital documents according to the system and method of the present invention;

FIG. 6A shows a digital ink annotation in the form of an enclosed shape around a text element;

FIG. 6B shows various digital ink annotations made to a web page;

FIG. 9 is a flowchart showing a method for finding a unique text range in a text element to serve as an annotation anchor, which may be used in the method of FIG. 8A, according to a presently preferred embodiment of the present invention;

FIGS. 11A-11C are exemplary illustrations of the detection, capture storage and association of ink with particular information in accordance with the present invention;

DETAILED DESCRIPTION OF THE EXEMPLARY EMBODIMENTS

Figure 1A:
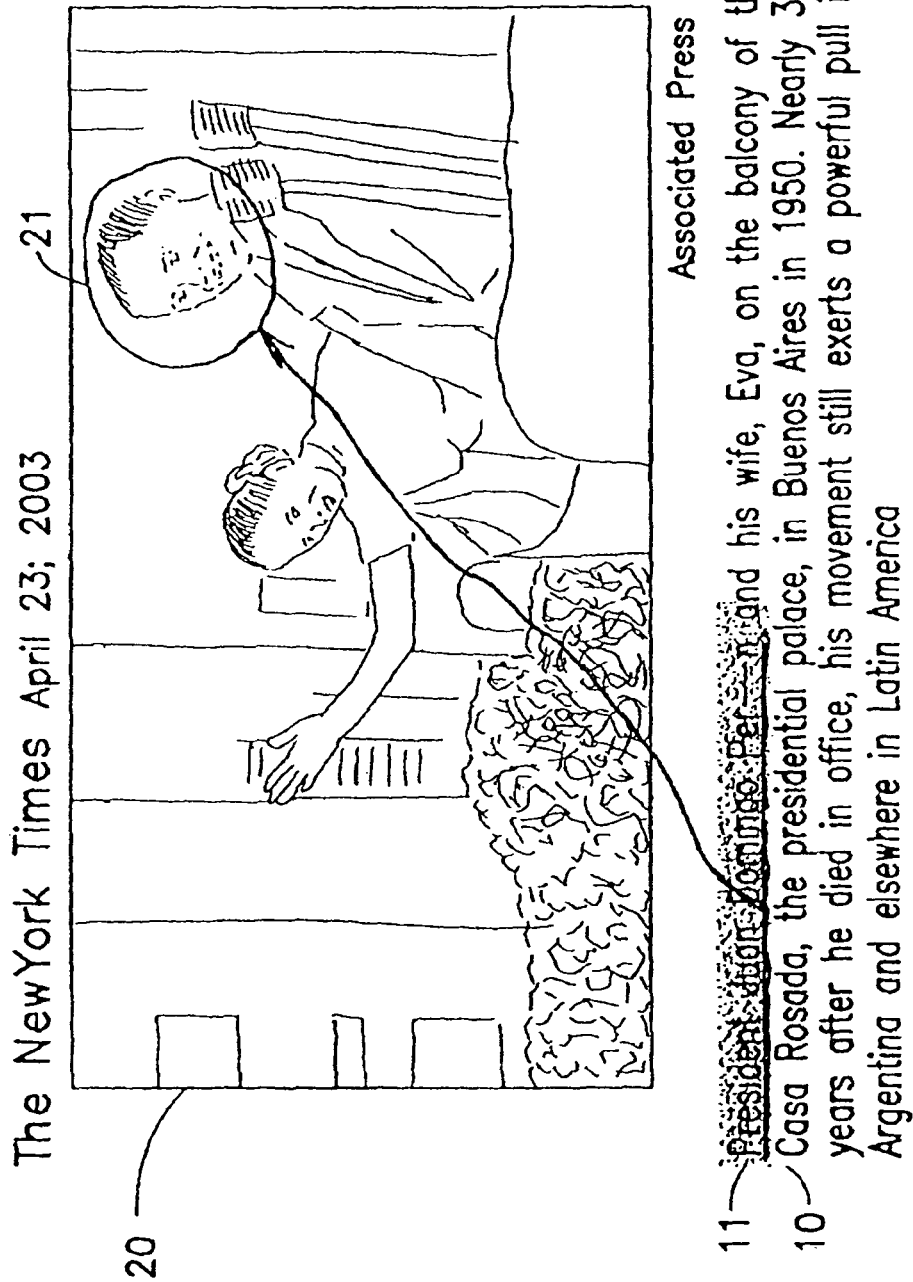
Figures 1D, 1E:
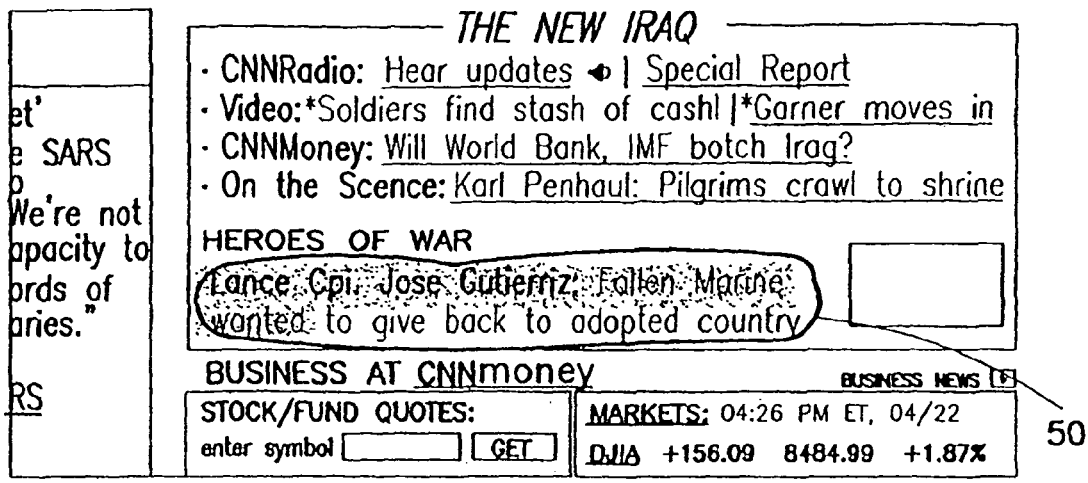

FIG. 2 is a flowchart showing a method of capturing, rendering, and understanding digital ink annotations on digital documents according to a general conceptual embodiment of the present invention. The system and method according to the present invention has three components: Ink Capture & Rendering 100; Ink Understanding 200; and Ink Storage & Retrieval 300. Ink Capture & Rendering 100 involves capturing the coordinates of the digital ink on the digital document and appropriately rendering the digital ink on the browser window. Ink Understanding 200 involves the association of the digital ink annotation with elements of the digital document. Ink Storage & Retrieval 300 involves the appropriate methods and systems for storing and subsequently retrieving a digital document which has been annotated with digital ink.

Ink Capture & Rendering 100 can be further broken down into three sub-components: Event Capture 125, Ink Rendering 150, and Ink Processing 175. Event Capture 125 refers to the acquisition of the coordinates for the digital ink annotation input by the user. In terms of the present invention, it is immaterial what type of input device is used for inputting the digital ink annotation. Ink Rendering 150 involves the rendering of the digital ink annotation in the browser. Ink Processing 175 involves the compression of the number of ink points and other processing which will be beneficial for storing the digital ink annotation.

One major component in Ink Understanding 200 is Ink to Document Association 250, in which elements within the markup language document being annotated are found in order to serve as annotation anchors for the digital ink annotation. Other data for storing the digital ink annotation, and for relating the digital ink annotation to the annotation anchor are found and processed. In some embodiments of the present invention, Ink Understanding may also include Gesture Recognition, where the input of the user is determined to be gestures indicating that one or more actions should be taken.

Ink Storage & Retrieval 300 can be further broken down into two sub-components: Ink Storage 330 and Ink Retrieval 370. In Ink Storage 330, the digital ink annotation is stored as a separate annotation layer. In the preferred embodiment, the ink points, text ranges, relative reference positions, and other annotation attributes, such as window size and time stamp, are stored with the URL of the markup language document being annotated. These are stored using a markup language schema, where markup tags are used to indicate the various attributes.

The method according to the presently preferred embodiment has been generally, i.e., conceptually, described with reference to the flowchart in FIG. 2. Below, the next four sections describe in general terms, with reference to the variations which are possible, how the presently preferred embodiment is implemented. Section I provides a background of how the W3C DOM is used in general, with reference to the particular inventive uses of the present invention. Section II discusses the Ink Capture & Rendering 100 component of the present invention. Section III describes the Ink Understanding 200 component of the present invention. Section IV discusses the Ink Storage & Retrieval 300 component of the present invention. After those components have been explored in detail, a specific implementation of the presently preferred embodiment is described in reference to FIGS. 8-8A-8B-8C-8D and FIGS. 9-9A-9B-9C below. It should be understood that FIG. 2 is a general schematic flowchart of the conceptual steps in the presently preferred embodiment; thus, the steps therein may be performed in a different order, or some steps may be combined or a single step separated into two or more parts. Similarly, the present invention is not intended to be limited to the order, the number, or overall structure of steps in FIGS. 8-8A-8B-8C-8D and FIGS. 9-9A-9B-9C.

The present invention provides a general purpose association between a digital ink annotation and the digital document being annotated, which takes into account the dynamic nature of digital documents as they are being accessed through a browser. The markup language schema used for storage addresses the variations in rendering caused by using different browsers or different devices. By anchoring the digital ink annotation to an element in the markup language document, the present invention provides for the optimal re-positioning, or re-rendering, of the digital ink annotation in relation to the relevant elements in the annotated digital document.

Specific details of implementing the presently preferred embodiment in an Internet Explorer/Windows environment are discussed. As has been already noted, however, the present invention is by no means limited to either the Microsoft Windows operating system or the Internet Explorer web browser. Other embodiments may be implemented in other web browsers, such as Netscape Navigator, Apple's Safari, Mozilla, Opera, etc. Furthermore, the browser may be running over a system running any operating system, such as the Apple Mac OS, the Symbian OS for cellular telephones, the Linux operating system, or any of the flavors of UNIX offered by the larger computer system designers (e.g., Solaris on Sun computer systems; Irix from Silicon Graphics, etc.). In other words, the present invention is platform-independent. Furthermore, the present invention is device-independent, in the sense that the markup language document browser may be running on any type of device: Personal Digital Assistant (PDA) or any hand-held computing device, a cellular telephone, a desktop or laptop computer, or any device with the capability of running a markup language document browser.

It is also contemplated that, as discussed in the Background section, future browsers will be more than merely web browsers, but rather portals to any type of data and even active files (executables), as well as a powerful processing means (or framework) for acting upon data. The present invention is intended to be implemented in such browsers as well.

The presently preferred embodiment uses the Document Object Model (DOM) functionality present in web browsers, as will be described in Sect. I below. The DOM is a platform- and language-neutral application programming interface (API) standard that allows programs and scripts to dynamically access and update the content, structure, and style of documents (both HTML and XML). Using the DOM API, the document can be further processed and the results of that processing can be incorporated back into the presented page. In essence, the DOM API provides a tree-like model, or framework, of the objects in a document, i.e., when an XML/HTML document is loaded into an application (such as a web browser like Internet Explorer), the DOM API creates a DOM of the downloaded document in the form of an in-memory tree representation of the objects in that document. Using the DOM API, the run-time DOM may be used to access, traverse (i.e., search for particular objects), and change the content of the downloaded document.

In addition, the presently preferred embodiment uses Browser Helper Objects (BHOs), as will be discussed in further detail below. When a browser such as Internet Explorer starts up, it loads and initializes Browser Helper Objects (BHOs), which are Dynamic Linked Libraries (DLLs) that are loaded whenever a new instance of Internet Explorer is started. Such objects run in the same memory context as the web browser and can perform any action on the available windows and modules. In some versions of the Windows operating system, the BHOs are also loaded each time there is a new instance of Windows Explorer, Microsoft's browser for viewing the memory contents of the computer system. The BHOs are unloaded when the instance of Internet Explorer (IE) or Windows Explorer is destroyed.

The mapping of coordinate points and markup elements in the markup language document is achieved by modifying standard DOM methods. DOM APIs are used to determine where elements are in relation to the digital ink annotation and whether a particular element is appropriate for an annotation anchor.

I. Overview of W3C Document Object Model, Dynamic HTML, and the Browser DOM

The W3C (World Wide Web Consortium) Document Object Model is a platform- and language-neutral interface that allows programs and scripts to dynamically access and update the content, structure and style of markup-language documents. The document can be further processed and the results of that processing can be incorporated back into the presented page.

As stated by the W3C, the goal of the DOM group is to define a programmatic interface for XML and HTML. The DOM is separated into three parts: Core, HTML, and XML. The Core DOM provides a low-level set of objects that can represent any structured document. While by itself this interface is capable of representing any HTML or XML document, the core interface is a compact and minimal design for manipulating the document's contents. Depending upon the DOM's usage, the core DOM interface may not be convenient or appropriate for all users. The HTML and XML specifications provide additional, higher-level interfaces that are used with the core specification to provide a more convenient view into the document. These specifications consist of objects and methods that provide easier and more direct access into the specific types of documents. Various industry players are participating in the DOM Working Group, including editors and contributors from JavaSoft, Microsoft, Netscape, the Object Management Group, Sun Microsystems, and W3C. The Document Object Model provides a standard set of objects for representing HTML and XML documents, a standard model of how these objects can be combined, and a standard interface for accessing and manipulating them. Vendors can support the DOM as an interface to their proprietary data structures and APIs, and content authors can write to the standard DOM interfaces rather than product-specific APIs, thus increasing interoperability on the Web.

The Dynamic HTML (DHTML) Document Object Model (DOM) allows authors direct, programmable access to the individual components of their Web documents, from individual elements to containers. This access, combined with the event model, allows the browser to react to user input, execute scripts on the fly, and display the new content without downloading additional documents from a server. The DHTML DOM puts interactivity within easy reach of the average HTML author.

The object model is the mechanism that makes DHTML programmable. It does not require authors to learn new HTML tags and does not involve any new authoring technologies. The object model builds on functionality that authors have used to create content for previous browsers.

The current object model allows virtually every HTML element to be programmable. This means every HTML element on the page, like an additional ink annotation created dynamically, can have script behind it that can be used to interact with user actions and further change the page content dynamically. This event model lets a document react when the user has done something on the page, such as moving the mouse pointer over a particular element, pressing a key, or entering information into a form input. Each event can be linked to a script that tells the browser to modify the content on the fly, without having to go back to the server for a new file. The advantages to this are that authors will be able to create interactive Web sites with fewer pages, and users do not have to wait for new pages to download from Web servers, increasing the speed of browsing and the performance of the Internet as a whole.

(1) DOM Design for Browsers

The DOM is a Document Object Model, a model of how the various objects of a document are related to each other. In the Level 1 DOM, each object tag represents a Node. So with, <P>This is . . . paragraph</P> two nodes have been created: an element P and a text node with content, 'This is . . . paragraph'. The text node is inside the element, so it is considered a child node of the element. This is important for understanding how DOM functionality is used to parse the parts of a document. Conversely, the element is considered the parent node of the text node.

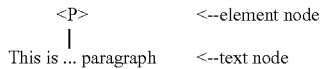

Now in,
<P>This is . . . <B>paragraph</B></P> the element node P has two children, one of which has a child of its own:

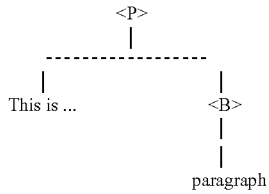

The element node P also has its own parent; this is usually the document, sometimes another element like a DIV. So the whole HTML document can be seen as a tree consisting of a lot of nodes, most of them having child nodes (and these, too, can have children).

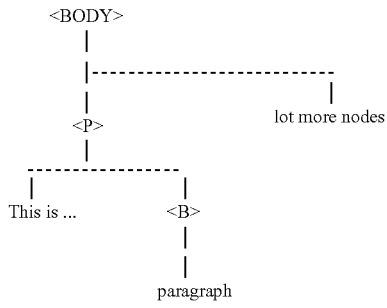

(2) Walking Through the DOM Tree

For obtaining the structure of a document, the browsers offer DOM parsing scripts. Knowing the exact structure of the DOM tree, one can walk through it in search of the element that needs to be accessed and influenced. For instance, if the element node P has been stored in the variable x, for the BODY element, x.parentNode can be used. To reach the B node x.childNodes [1] can be used.

childNodes is an array that contains all children of the node x. As the numbering starts at zero, childNodes [0] is the text node 'This is a' and childNodes [1] is the element node B. There are two special cases: x.firstChild accesses the first child of x (the text node), while x.lastChild accesses the last child of x (the element node B).

Thus, if P is the first child of the body, which in turn is the first child of the document, the element node B can be reached by either of these commands:

document.firstChild.firstChild.lastChild;
   document.firstChild.childNodes[0].lastChild;
   document.firstChild.childNodes[0].childNodes[1];
   document.firstChild.childNodes[0].parentNode.firstChild.childNodes[1];

(3) Using DOM Interfaces for Instant and Permanent Rendering of Ink

Using these programmer tools, instant as well as the subsequent ink annotation element is created within a span container. Initially a "trailElement" <SPAN> container is created. During the inking mode the mouse moves are captures and dynamic "trailDot" <DIV> elements are produced. These div elements have a specific layer, font size, color and pixel width so as to give a physical impression of inking on the document. The div elements are dynamically appended as children inside the parent span container. As soon as the mouse is up, the user does not need to view the dynamically produced ink in its current form. As the span element consists of innumerable div elements, the run time memory of the browser or the script memory space is freed by deleting the parent span element from the document hierarchy.

In its place, a standard browser specific element is produced. In the case of Internet Explorer this element is an Active X control called the structured graphics control. The ink can be supplied to this control with various attributes like color, z axis, number of points and polyline information, so that another span element is created at every mouse up with the composite ink graphics element as the child. The beauty of this method is that the graphics element is at a sufficiently low level and optimized for the IE browser. An additional bonus is that events can also be added to the control, so a mouseover event on the ink annotation could pop up information like comments on the ink annotation.

(4) DOM Utilities for Ink Annotations

The main DOM utilities are the events and their properties of bubbling, canceling, and handling. Clicking a button, moving the mouse pointer over part of the webpage, selecting some text on the page—these actions all fire events and functions can be written to run in response to the event. This particular piece of code is generally known as an event handler as it handles events.

TABLE 1

Mouse Events for ink annotations

| Mouse event | Generated when the user: |
| --- | --- |
| onmouseover | Moves the mouse pointer over (that is, enters) an element. |
| onmouseout | Moves the mouse pointer off (that is, exits) an element. |
| onmousedown | Presses any of the mouse buttons. |
| onmouseup | Releases any of the mouse buttons. |
| onmousemove | Moves the mouse pointer within an element. |

(5) Event Bubbling

This is an important concept in event handling and as the implementation is different across browsers, ink event handling will also have to be done differently. For capturing mouse events for ink annotations, it is needed to disable events for some elements but enable events for others. In many cases it is required to handle events at the lower (for instance, an image element) as well as the upper levels (for instance, the document object). For doing these actions, the concepts of event bubbling and capturing that are included as DOM standards are used.

Figure 3A:
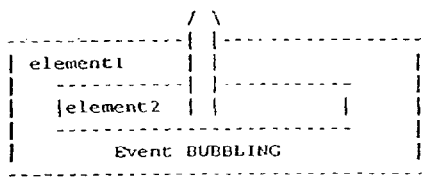
FIGS. 3A-3B-3C illustrate event bubbling, event capturing, and the process of handling an event, respectively, in the W3C Document Object Model (DOM) standard.

FIG. 3A illustrates event bubbling. As shown in FIG. 3A, the event handler of element2 fires first, and the event handler of element1 fires last. The bubbling from element2 can be stopped by returning false from its event handler or by setting an event bubble flag to false.

Figure 3B:
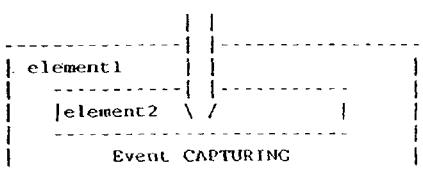

FIG. 3B illustrates event capturing. As shown in FIG. 3B, the event handler of element1 fires first, and the event handler of element2 fires last.

Figure 3C:
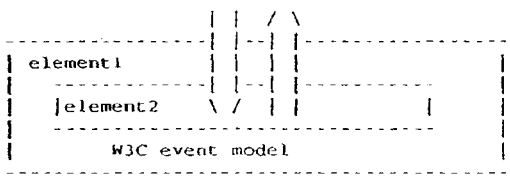

Any event occurring in the W3C event model is first captured until it reaches the target element and then bubbles up again, as shown in FIG. 3C.

To register an event handler in the capturing or in the bubbling phase the addEventListener( ) method is used. If its last argument is true the event handler is set for the capturing phase, if it is false the event handler is set for the bubbling phase.

element1.addEventListener('click', doSomething2, true)
element2.addEventListener('click', doSomething, false)

If the user clicks on element2, the event looks if any ancestor element of element2 has a onclick event handler for the capturing phase. The event finds one on element1. doSomething2( ) is executed. The event travels down to the target itself, no more event handlers for the capturing phase are found. The event moves to its bubbling phase and executes dosomething( ), which is registered to element2 for the bubbling phase. The event travels upwards again and checks if any ancestor element of the target has an event handler for the bubbling phase. This is not the case, so nothing happens.

The reverse would be:
element1.addEventListener('click', doSomething2, false)
element2.addEventListener('click', doSomething, false)

If the user clicks on element2 the event looks if any ancestor element of element2 has a onclick event handler for the capturing phase and doesn't find any. The event travels down to the target itself. The event moves to its bubbling phase and executes dosomething( ), which is registered to element2 for the bubbling phase. The event travels upwards again and checks if any ancestor element of the target has an event handler for the bubbling phase. The event finds one on element1. Now doSomething2( ) is executed.

(6) Dynamic HTML

Dynamic HTML (DHTML) is a combination of HTML, styles and scripts that can act on the HTML elements and their styles so as to enhance the user interaction with web pages. For this, one must have access to the HTML elements within the page and their properties. DHTML allows the developer to access multiple elements within the page in the form of collections or arrays. "Collections" in the Microsoft system, and "arrays" in Netscape, provide access to a group of related items. For example, the images collection is an array that contains a single element for each image on the web page. Because 'images' is a child object of document, one can access it as: document.images. One can index the images collection by number, or use an element's ID or name: document.images ("MyImage") After a reference is created to an object using a collection, one can access any of that object's properties, methods, events, or collections. With Dynamic HTML one can change element content on the fly for instance using get and set methods like innerText and innerHTML for text container elements.

(7) Dynamic HTML Utilities for Ink Annotation

In a preferred embodiment of the present invention, a list of DHTML utilities that have been added to the ink annotations:

1. Events have been added to the ink elements, so mouse-click, mouseover and other normal events can function over them.
2. The ink annotations have been made children of the annotation anchors that they are associated with. This helps in the selection of the elements sequentially through the document.
3. The style of the annotation can be programmatically changed. Some of the things achieved by changing style attributes:
    a) The ink annotations have been positioned in a z-layer higher than the original document. This helps in repositioning, resize and virtually most functions that ink objects should possess.
    b) A style class ("Drag") has been assigned to all ink annotations. So the user has the ability to manually reposition the annotation and check for associations.

(8) DHTML Based Tools for Ink Annotation

The ink annotations on the page can support movement by the use of a 'drag' style as mentioned in the last section. It follows the basic left pen drag on the annotation for dragging the ink to another area in the document. All the ink coordinates get repositioned with respect to a new reference position.

The ink annotations may need to be resized or scaled with respect to some reference. This is especially true for ink annotations on images. If the image size attributes are changed the ink must be translated to a new shape so as to retain its relevance within the image. Future methods that are being contemplated are methods to merge and segregate annotations based on locality, layout and to minimize storage requirements.

II. Ink Capture & Rendering

The functionality provided by the browsers for DOM and Dynamic HTML (DHTML) is used for the capture of coordinates of the pen or the mouse. Since the pen is a more advanced form of the mouse, most user interface developers use the same events for denoting pen events that denote mouse events, at present. The mouse event property of the DOM Window Object gives direct access to the instant ink coordinates. In the preferred embodiment of the present invention, the ink coordinates are smoothed in real time using a hysteresis filter to reduce the jitter introduced by the stylus or the mouse. See R. Duda and P. Hart, PATTERN CLASSIFICATION AND SCENE ANALYSIS, John Wiley & Sons, NY, 1973, for an exemplary hysteresis filter. Such a non-linear filter also helps in smoothing out the jaggedness associated with writing notes. These coordinates are screen coordinates relative to the top and left of the user area of the browser, which can serve as the origin of reference. After adding offsets for scrolling, the absolute position of the mouse with respect to the reference origin is obtained. In an embodiment which has both digital ink annotation and gesture recognition, alphabet keys in conjunction with ctrl, alt, and shift keyboard modifiers are used to differentiate the ink to be used for the annotation mode and the recognition mode. The right mouse button depressed after a keyboard "G" or "g" is struck, sets the gesture mode whereas the right mouse button depressed after a keyboard "I" (Ink) or "D" (Draw) defines the mode for ink-annotations. The left mouse button is associated with a number of user interface features such as selection, moving to hyperlinks, resizing and is avoided to alleviate the need to disable some of the left mouse events. In the inking and pen-gesture modes, mouse right click events on images and the dynamic context menu have been disabled, so as to not interfere with their action.

In the preferred embodiment, cursor changes are used to reflect the two modes, a pen-hand for the ink-annotation and a circular 'G' for indicating gesture mode. Other combinations of the keyboard modifiers and/or raw keys can be used for more modes. The implementation of the capture engine is slightly different for different browsers. Event handling functions handle mouse events like up, down, move, and drag and populate data structures with the coordinates for recording.

In an Internet Explorer embodiment, the rendering is done using ActiveX (similar standard components can be used in other browser embodiments) and the above event-handlers deal with the allocation and withdrawal of the drawing components like the pens, colors, the device context of browser window and refreshing the browser. Rendering the pen or mouse movements is a browser specific task. A rendering engine has been developed for Internet Explorer 6 using helper objects and connecting to the Web Browser COM component. See S. Roberts, PROGRAMMING MICROSOFT IE 5, Microsoft Press, Microsoft Corporation, Redmond, Wash., 1999, pages 263-312, for details.

(1) Specific Mouse Event Capturing Techniques

The stylus event capture methods include pen-down, pen-up, pen-move, mouse-over, mouse-out, mouse-click and a lot more events that can be handled using functions or converted to more complex events. There are three methods that can be used for capturing ink and annotating a web page.

The first method is using a transparent layer or easel over the browser window. This would involve creating a drawing application that runs in conjunction with the browser, and communicates with events within the browser. As soon as the drawing starts, the application has to connect to the browser event model and find what HTML elements are being drawn over and somehow simulate the browser to create dynamic digital ink over its client area. Alternatively, the application could give the impression of drawing over the browser and then create an HTML graphic element on the browser window as soon as the drawing mode ends, typically at a mouse-up event.

The transparent layer method has the advantage of being browser independent for drawing purposes, but could be browser dependent at the end of inking when the browser needs to create a separate HTML element. Some problems are to find ways to capture the exact browser client area so as to ink only within limits. Simulated events defined in the W3C Document Object Model could play a significant role here.

Figure 4:
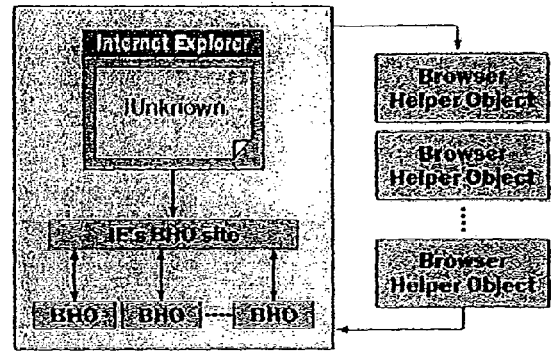
FIG. 4 shows how Internet Explorer loads and initializes Browser Helper Objects (BHOs)

The second method is to use an in-procedure or in-proc dynamic link library (DLL) that runs with the browser window. Functions within the DLL capture the browser events like mouse up and mouse down and stylus movements and aid in drawing to the browser window. This method is Windows and Internet Explorer specific as the browser provides an interface called a Browser Helper Object ( ) interface that runs in the form of a DLL and hooks into the Component Object Model (COM) container of the browser. See S. Roberts, PROGRAMMING MICROSOFT IE 5, mentioned above, for details. Using the APIs of either the Microsoft Foundation Classes (MFC) or the Active Template Library (ATL) within the BHO, optimized code can be produced for handling the explorer events to ink on the client area. The functions within the DLL create an active connection with the COM iwebBrowser interface, register with the object as a server listening to specific events, and take specific actions like coloring pixels on mouse movement. In its simplest form, a BHO is a COM in-process server registered under a certain registry's key. Upon startup, Internet Explorer looks up that key and loads all the objects whose Class IDs (CLSIDs) are stored there. The browser initializes the object and asks it for a certain interface. If that interface is found, Internet Explorer uses the methods provided to pass its IUnknown pointer down to the helper object. This process is illustrated in FIG. 4.

The browser may find a list of CLSIDs in the registry and create an in-process instance of each. As a result, such objects are loaded in the browser's context and can operate as if they were native components. Due to the COM-based nature of Internet Explorer, however, being loaded inside the process space doesn't help that much. Put another way, it's true that the BHO can do a number of potentially useful things, like subclassing constituent windows or installing thread-local hooks, but it is definitely left out from the browser's core activity. To hook on the browser's events or to automate it, the helper object needs to establish a privileged and COM-based channel of communication. For this reason, the BHO should implement an interface called IObjectWithSite. By means of IObjectWithSite, in fact, Internet Explorer will pass a pointer to its IUnknown interface. The BHO can, in turn, store it and query for more specific interfaces, such as IWebBrowser2, IDispatch, and IConnectionPointContainer.

Although this method seems heavily Microsoft centric, other browsers could well provide similar interfaces to their browser objects to help render ink within their client areas. As such, this is the most optimal method to render on the browser as the ink is just being drawn to a window and does not have to go through multiple layers of redirection right from the browser level to the wrappers beneath which is what the third method will describe.

After rendering the ink, the BHO has to convert the inked points to an actual HTML annotation element. This can be done as the BHO has a full view of the DOM and can access document fragments of the downloaded document. The Web-highlighter project, mentioned in the Background section, looks into annotating the text of a document.

Although the first render methods and hooks using the BHO technology were created so that events of IE4+ can be captured and the ink drawn on the browser, these methods are highly Windows and Internet Explorer specific, thus, a more generic approach, applicable to any type of browser and any type of markup language document, is used in the preferred embodiment of the present invention, and is described below as the third method.

The third method uses the DHML and DOM interfaces used in substantially all contemporary graphical browsers. The DHTML and DOM interfaces have best been exploited by scripts like JavaScript. See D. Flanagan, JAVASCRIPT: THE DEFINITIVE GUIDE, 4th Edition, O'Reilly, NY 2001, for more details. The scripts are at a higher abstraction than the internal language in which the browsers are written, but they provide a powerful object model, event interface and dynamic interaction methods to developers on web browsers. Although there is still a significant amount of divergence in the APIs that the scripts provide the developer, there is a lot of commonality currently as the W3C DOM standards body aggressively releases specifications browsers of today are gradually complying with, as observed in subsequent browser versions.

The preferred embodiment uses scripts, notably Javascript, to capture mouse events and render the same as ink within the browsers. The mouse events are multiplexed for ink, gesture or other modalities and event handlers are defined that create temporary miniature ink objects on the page for the browser to render. The Javascript implementation of Dynamic HTML allows the ink to be rendered on a separate layer over the current HTML elements. The events provide a rich functionality through the DOM event object. This event object stores a current snapshot of the mouse coordinates, the kind of event(s), like mouse-click and mouse-up, that one can query through DHTML, an estimate of the target span over which the event occurred, and event bubbling.

Pen-down and pen-up events in conjunction with keyboard modifiers or alphabet keys define modes for the render engine, so that the engine can apply specific style attributes like color, width, speed, trail-size to the ink. For instance, in an embodiment which has a gesture capability, the gesture mode can be denoted by a pink trail with a width of 2 pixels that is rendered instantly with maximum of 2000 trail points. In one application of the gesture mode, that of animating an ink annotation, which is used in the preferred embodiment, the render engine uses a red trail with a width of 3 pixels which is rendered with a speed of 40 points per second (a sleep of 25 milliseconds per point) with a maximum of 4000 trail points.

(2) Ink Rendering

The render engine renders the ink annotations in two situations. The first situation is a real-time rendering of ink when the user inks over the page using the pen or the mouse. This algorithm follows a DOM compliant standard method. When the pen stylus events are captured on screen the absolute coordinates are detected by the render engine and converted in real time into miniature DIV elements representing points. During the initialization on the mouse-up event a main DHTML SPAN container is produced that collects the subsequent point DIV elements that are dynamically produced on every mouse move. This instant rendering method has been implemented for both IE and Netscape and all Mozilla or Gecko based browsers. Depending on the CPU load and browser speed at any instance of time, enough points may not be captured to completely describe the trail. For this purpose, a straight line algorithm is used in the preferred embodiment to generate pixel coloring between the acquired points. For most Intel processors with speeds above 400 MHz and relatively unloaded CPU, the algorithm produces good curvatures and natural looking ink with straight lines for curve approximation. This algorithm can be substituted by a polynomial curve-splines method, so that the rendering appears natural but since the simplest method seems to give good performance this dynamic rendering method has not been implemented.

In the inking mode, the ink color used is dark blue and in gesture mode, the ink 'trail' is colored pink. Limits to the production of this dynamic ink are set in the preferred embodiment to 3000 points for gestures or sketching as the production takes up a lot of computing power and memory of the browser during the inking phase. But, if the ink is stored in the form of these elements on the page, it would take a long time for each page to be parsed and stored. As such, the actual rendered ink is not the same as the dynamically generated SPAN parent element. This element is deleted as soon as the inking or gesture mode is finished; freeing up the browser resources and in place a more browser specific HTML annotation element is produced as articulated below.

The second rendering situation is when the inking is complete and when all the ink is processed and stored. The ink is stored as a HTML graphics component in Internet Explorer that uses a real-time compressed string of inked data. See J. Perry, "Direct Animation and the Structured Graphic Control", technical report published in the *Web Developer's Journal*, Jan. 28, 2000, pages 20-23. This situation arises twice: once on the mouse-up event in inking mode signifying that the inking process is complete and the other when the stored ink annotation is retrieved in the form of a string from the retrieval module. This retrieval module is explained in detail below, where the document fragment anchoring the ink along with its relative coordinates, the relative position, and the absolute coordinates of the ink will be discussed. The render engine then applies a transformation to the ink depending on the current position of the document fragment and recalculates the canvas size or boundaries of the ink object.

The main control used for the rendering of the ink is by using the polyline interface of the ActiveX based structured graphics control. This graphics control provides client-side, vector-based graphics, rendered on the fly on a webpage. This browser specific method of inking graphics has the obvious advantage of low download overhead, as compared to ink as image for instance, coupled with high performance on the client. The control renders the resulting vector shape as a windowless graphic, transparent to the background of the page, and which can be programmatically manipulated by scaling, rotating, or translating methods. Pen or mouse or right-click events can also be defined for the graphics control making it an ideal annotation object in Internet Explorer.

In Netscape Navigator (version 4 and higher, NS4+), ink capture and rendering has been implemented by similar standard DOM methods (e.g., the Mozilla Optimoz project). At the end of the annotation, the DIV elements of the dynamic ink can be substituted by a HTML object similar to the ActiveX graphics control of Internet Explorer.

(3) Ink Processing

Figure 5:
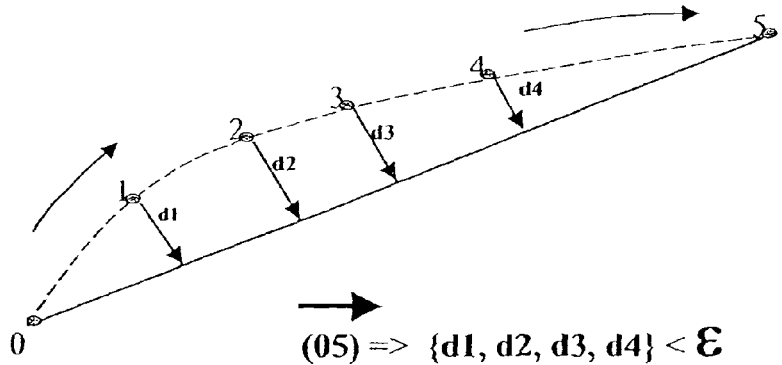
FIG. 5 shows an example of how the ink point compression algorithm works in the preferred embodiment of the present invention.

The ink coordinates that are acquired go through two different filters. The first one is a smoothing hysteresis filter that averages each subsequent point with previous points. This simple low pass filter removes the jagged edges that accompany ink strokes. Further, a polygonal compression method, which is described in K. Wall and P. Danielsson, "A fast sequential method for polygonal approximation of digitized curves", in *Proc. Of Computer Vision, Graphics and Image Processing*, Vol. 28, 1984, pages 220-227, has been implemented in the preferred embodiment to reduce the number of points. This compression involves finding the longest allowable segment by merging points one after another after the initial one, until a test criterion is no longer satisfied, as shown in FIG. 5. The output line is a segment from the initial to the last point that passed the test. The criterion involves an error parameter epsilon ($\epsilon$) that is defined as the maximum allowable area deviation per length unit of the approximating segment. In the example of FIG. 5, points 1-4 are dropped because the lengths of perpendiculars d1, d2, d3, and d4 to segment 0-5 are below tolerance $\epsilon$. When the algorithm was applied real-time for ink compression in Internet Explorer 6 in a Windows XP machine with 1 GHz processor and an epsilon of 3 pixels, the compression was observed to attain a factor of around 10 for straight line inking, around 2 for gradual curves and around 1.5 for sharper curves.

III. Ink Understanding

Ink understanding is separated into two separate stages: Ink recognition or gesture recognition, and Ink to document association. Once the ink points are captured, smoothed and rendered, they are sent for computation to either a gesture recognition module or to an ink-document association module in the current implementation. Another component that is relevant to understanding digital ink is the ink registration module. The registration module comes into play when there are changes in the document layout or style that is detected while loading the annotation layer in the browser after the document is loaded. This is discussed in Sect. IV: INK STORAGE & RETRIEVAL below.

(1) Gesture Recognition Module

One of the many uses of ink on a digital document is the utility of quick hand-drawn gestures. If the users can easily customize their ink gestures for editing on a document, it could serve as a fast assistive mechanism for document manipulation. To highlight the utility of this mode, a simple single-stroke gesture recognizer module and an ink gesturing mode were added to the architecture as a way to edit, modify, resize and associate ink annotations as well as to expose some peripheral features of the annotation system.

The usage of gestures for editing documents has been researched for digital documents. Although graphical user interfaces are prevalent for editing text based digital documents using the mouse, gesture interfaces especially when the pen stylus is set to become more dominant tend to be a lot more relevant. See A. C. Long, Jr, J. A. Landay, and L. A. Rowe. "PDA and gesture use in practice: Insights for designers of pen-based user interfaces", Technical Report CSD-97-976, U.C. Berkeley, 1997. Pen styluses also have the mouse equivalents of left and right mouse buttons. The right button depressed after a keyboard "G" or "g" is struck sets the gesture mode for ink. The gesture mode is denoted by a pink trail with a width of 2 pixels that is rendered instantly with maximum of 2000 trail points. The pen-down event is captured by the system and followed by continuous pen-move events that provide a temporary pen trail, which indicates to the user the progress of the gesture. A subsequent mouse-up, a configurable half second pause or if the gesture length goes above a configurable threshold the gesture ends and all the preceding ink points are used to decide if the gesture is to be associated with a valid gesture handler function.

The users can customize these pen gestures to suit their requirements and a web form could be created for the express purpose of capturing gestures and associating handlers with the particular gestures. The ink-gesture is checked against the above-mentioned gestures and on a match the appropriate gesture handlers are invoked. Gesture handling routines could modify the document structure (annotations like highlighting, bold, etc.) by using DOM APIs, or access the document history object for navigation, or help in the creation of a partial HTML page with inline annotations. It is contemplated that embodiments of the present invention will use the utility of combining gestures with the DOM to create annotations.

(2) Ink to Document Association Module

The algorithm uses DOM and DHTML to associate underlying HTML elements with ink and was implemented using Javascript scripts. The DOM can be queried for a number of document properties and attributes, some of which are useful for digital ink annotations:

1. Targets of pen-events that are HTML elements for a web-page,
2. Text ranges
3. Text or HTML content of any element
4. The parent of an element; finding parents recursively can fix an approximate position for the element in the document hierarchy or the DOM tree
5. Image elements and attributes
6. The offsets of bounding boxes and their widths and heights In addition, the essence of DHTML is that the dynamic or runtime representation of the HTML document (or the HTML DOM) can be altered on the fly. In other words, elements can be introduced into the DOM, existing DOM elements and their attributes can be changed, events can be assigned to elements and individual styles or the document style sheet itself can be changed using standard methods. Although standardization has not been achieved completely yet across all browsers, this very dynamic nature of the HTML DOM implemented in current browsers makes them suitable for ink annotations.

The logical mapping from screen points in the physical coordinate system to HTML elements is achieved by modifying basic DOM methods. For instance, the DOM in Internet Explorer 6 gives a rough access to text range objects at the word or character level given the physical coordinates in the browser user area. Thus for finding an appropriate anchor for any arbitrarily positioned ink mark, HTML elements are determined from the DOM close to the ink or below the ink. Pen event targets and their spatial positions are determined through the event model and by accessing the DOM. Important points within the ink boundaries, like those at pen-down, pen-up and the centroid are probed. The types of HTML elements in proximity with the ink points are thus determined using the DOM APIs. This helps in deciding whether the ink association is to be mapped with text elements or with table, image or object elements.

Figure 6A:
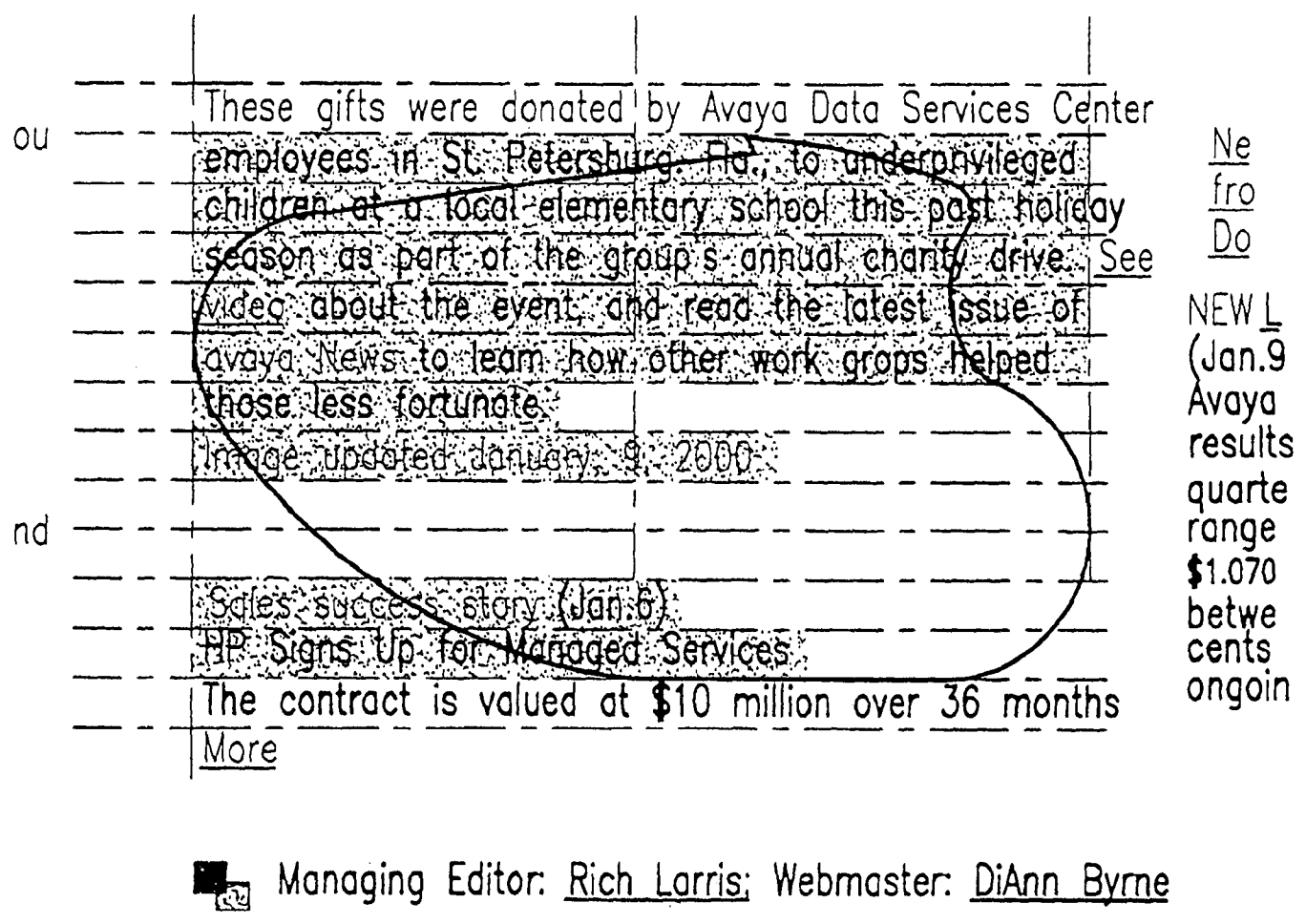

FIG. 6A shows an association of ink with text elements. The bounding box of the ink is determined and the text ranges within the boundary region are queried using the DOM API's. A collection of text ranges is obtained by manipulating the boundaries of the text range and may be stored with the ink annotation. The association algorithm to anchor an ink annotation can be thought of as a number of prioritized filters. The output of any filter would be a successful association anchor or the algorithm passes to the next filter.

Each text range within the collection is checked for uniqueness within the DOM. As soon as a range is found to be unique, it is made the annotation anchor and the ink is stored with reference to the current bounding rectangle of this anchor.

If none of the text ranges are unique, the algorithm passes on to the next filter. The text range below the centroid or closest to the centroid of the ink-shape is chosen and expanded character by character on either side within limits imposed by wrapping of the text. At each expansion, the range is checked for uniqueness within the DOM, and if unique, is stored along with the ink.

If one of these text ranges is a unique string within the entire document, that range is stored and its absolute position information along with the ink annotation. If none of the ranges is unique in the collection of text ranges obtained from the ink, a search starts for a unique character string from the centroidal text range among the collection. The text range contents are increased by a character on one end and then checked for uniqueness within document. If this fails, a character is included on the other side and the check continues until a unique anchor is found, in which case the ink, anchor and positional information are stored as before. If a unique text range is not found after all these filters, text ranges just above and below the bounds are queried for distinct anchors and similar action is taken if found.

If none of the above methods results in a unique text anchor, an anchor is found that is non-unique and its occurrence count within the document is computed. This occurrence count is then stored along with the anchor text and is used when the annotation is to be retrieved. The retrieval algorithm is described in Sect. IV below, in which how the occurrence count is used for locating the text anchor and its position is described.

Figure 6C:
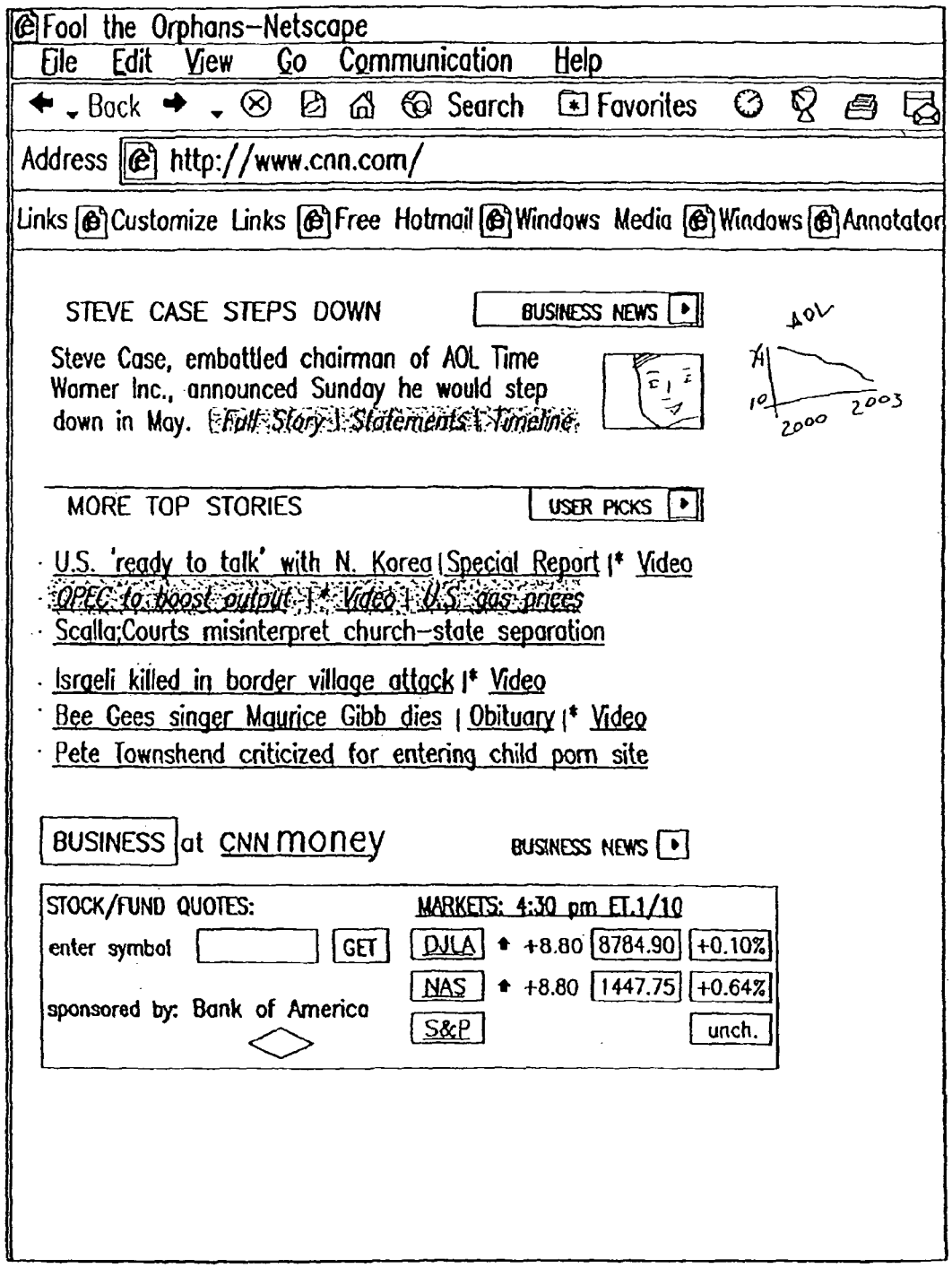
FIG. 6C shows a partial web page with the inline digital ink annotations from FIG. 6B, and has been further annotated by the addition of a hand-drawn plot.

In FIG. 6A, the selected text ranges are shown by a change in the background color. This is also seen in FIG. 6B for the text associated with pen annotations. Selecting text ranges with ink is useful for selecting columns within tables. FIG. 6B shows where the first column of the stock table is selected using ink. In the preferred embodiment, an array of text ranges are obtained and the DOM specifies the corresponding elements (the column tag in FIG. 6B), so that a table can be repopulated with that column. A user can select a block of non-contiguous text, store it in the clipboard, and then create an annotated partial HTML page, such as shown in FIG. 6C (from the elements in FIG. 6B). Blocks from a markup document can also be saved for offline collaboration or as an authoring tool to clip webpages for viewing on handheld devices.

The text ranges themselves are present in an annotation specific data structure such as a collection or an array. A subsequent call to a gesture recognizer can access the DOM and change the background and font of all those ranges.

The W3C DOM provides methods to get fragments of a HTML page. Fragments of a selection inside an HTML page can be stored and reconstructed as a partial HTML page. The Selection object provided in the DOM of popular browsers is used in the preferred embodiment to obtain the ranges and create a complete new page from a fragment. In an implementation with gesture recognition, a gesture handler uses this capability to popup a partial page that has a dynamic snapshot of the annotations in the main page, as is shown in FIG. 6C. This inline-annotated page could be, e.g., emailed for offline collaboration. As noted above, FIG. 6C is a partial HTML file obtained from FIG. 6B, with the annotations transferred as well. The ink seen in FIG. 6B was used to select the various text ranges which were subsequently annotated (bold, italics, etc.). In FIG. 6C, the ability to draw sketches or write a note on the margin of the partial HTML page is also illustrated.

(3) Types of Ink to Document Associations

The association algorithms between ink and document fragments on web pages can be made to closely represent ink on paper. In paper, ink annotations can be categorized into margin, enclosure, underline, block select, freeform and handwriting annotations. Association for block select and enclosing ink have been examined in some detail along with the algorithms for association.

The same method works for underline annotation, as the algorithm moves over the boundary and selects unique (or non-unique with occurrence count) text ranges and associates the underline with some document fragment. Margin annotations are comparatively odd cases as they may not be close to any text ranges, but may be associated with entire paragraphs within the document.

It is necessary to detect if the ink annotation is a margin ink annotation. The bounds of the document object, including the entire scroll length on both axes, is calculated which is also the total client area of the browser window. Six points at the intersection of the vertical lines at the 10 and 90% points on the x axes and the horizontal lines at the 30, 60 and 90% values along the y-axes are computed. HTML target elements are found by accessing the DOM at these points and the positions of the bounding boxes of the elements are computed. The extreme left, top, right and bottom among these boxes gives a rough outline or heuristic of the bounds of the populated area within the web documents. Margin annotations are those that are drawn beyond these boundaries.

Handling margin annotations requires finding which extreme end of the document they fall on, and then moving inward from that end projecting the boundary of the annotation. Again the algorithm to find either a unique fragment anchor or a recurring one with the occurrence count is used to fix the relative position of the margin annotation. The margin annotations have been found to attach quite robustly on either side of the document with the intended paragraphs on resize, style or font changes that affect the document layout.

When the annotation passes through all the text association filters, without tangible results, other HTML elements are queried the most common being images.

If any points within the ink annotation fall on an image element, the annotation is linked relative to the image bypassing all the text association methods. Similarly, if the centroid of the inked points or four other points within the ink boundaries (at 30% and 70% along both axes) fall within an image element, the ink is stored along with the position and shape information of the image. This facilitates the resizing of the annotation object along with resize of the image, so that meaningful information is not lost, although currently resizing and reshaping the ink annotation has not been implemented.

(4) Commonalities in Implementation

Except for the rendering, most of the algorithms described above for association of ink with document fragments are similar for Internet Explorer (IE) and the Mozilla based browsers. One of the most basic APIs that IE provides is to obtain a text range at the character level using mouse coordinates, a moveToPoint( ) method of a range object. Although there is currently no exact peer within the Mozilla browsers, those browsers are very DOM compliant and possess a mapElementCoordinate( ) method for capturing HTML element information. Though, details for implementing the system with Mozilla browsers like Netscape Navigator have not been worked on, it is felt that major DOM compliance on the part of Mozilla browsers would lend it easy to develop the architecture with those browsers too.

IV. Ink Storage & Retrieval (1) Ink Storage

In the current prototype implementation, the inking coordinates and all the attributes and properties needed to store ink annotations are stored in the local client machine as a separate annotation layer. Whenever the browser loads an URL the layer is dynamically overlaid on the rendered document.

The inked points, text ranges, relative reference positions and other annotation attributes like window sizes and time stamps are stored along with the URL of the annotated page in an annotation XML schema as shown below. For details of implementation, see J. Kahan, M. Koivunen, E. P. Hommeaux, and R. R. Swick, "Annotea: An Open RDF Infrastructure for Shared Web Annotations", in *Proc of the Tenth World Wide Web Conference*, Hong Kong, May 2001, pages 623-632, which is hereby incorporated by reference in its entirety. The DOM gives access to the bounding rectangles where the text ranges are rendered by the browser. The ink points are first converted into coordinates relative to the top, left corner of the bounding box of one of the ranges.

Most tags in the XML schema and values are self-explanatory. The different styles that the text can be manipulated with, and the different options for pens and brushes can be added to the STYLES element as STYLE and PENSTYLE child elements.

```
<?xml version="1.0" encoding="UTF-8"?>
<ANNODATA>
    <STYLES>
        <STYLE>
```

-continued

```
            <NAME>Default</NAME>
                <STYLESTRING>
                    color:#000000;backgroundcolor:#ffff00
                </STYLESTRING>
        </STYLE>
        <STYLE> ..... </STYLE>
        <PENSTYLE>
            <NAME>REDMEDIUM</NAME>
                <STYLESTRING>
                    pencolor #ff0000; penwidth 2
                </STYLESTRING>
        </PENSTYLE>
        <PENSTYLE> ..... </PENSTYLE>
    </STYLES>
    <ANNOTATIONS>
        <ANNOTATION TYPE:TEXT_INK POSITION:RELATIVE>        <AUTHOR>Ramanujan
                                                            Kashi</AUTHOR>
            <STYLENAME>Default</STYLENAME>
            <REFURL>http://www.avaya.com/</REFURL>
            <TIMING>30 Dec 2002, 17:50:23</TIMING>
            <WINDOW>
                    <WIDTH>800</WIDTH>
                    <HEIGHT>580</HEIGHT>
                    <CLIENTWIDTH>780</CLIENTWIDTH>
                    <CLIENTHEIGHT>2000</CLIENTHEIGHT>
            </WINDOW>
            <REFTEXT NUM:9>
                <RANGE ID:1 OC:1> employees </RANGE>
                <RANGE ID:2 OC:1> children at a local </RANGE>
                <RANGE ID:3 OC:1> season as part of the </RANGE>
                <RANGE ID:4 OC:1> video about the event </RANGE>
                ............
            </REFTEXT>
            <TITLE> Avaya Net Home Page </TITLE>
            <LINK> </LINK>
            <INKSTRING REF:1 SAMPLERTIME:1100 NUM:125>
                    204,409;1,0;1,2; .......
            </INKSTRING>
            <REFPOS>
                    <TOP>381</TOP>
                    <LEFT>210</LEFT>
            </REFPOS>
            <ID> E34&5%^FOL4$DR#(U </ID>
        </ANNOTATION>
</ANNODATA>
```

Figures 7A, 7B:
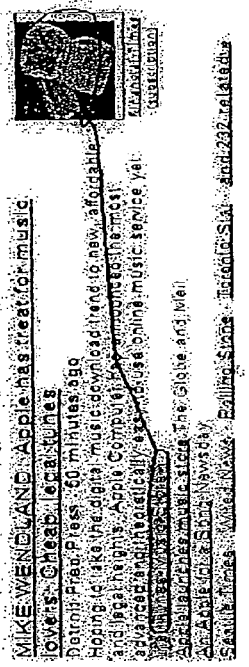
FIGS. 7A and 7B show a digital ink annotation of a web page and how that digital ink annotation is stored in the XML annotation schema, in accordance with a preferred embodiment of the present invention.

FIGS. 7A and 7B show both a digital ink annotation and how that digital ink annotation is stored in the XML annotation schema. In the XML schema, annotations are stored within ANNOTATION child elements within the ANNOTATIONS element. The attributes of the ANNOTATION element define the type and position of the annotations. The type could be TEXT_INK for text linked to ink, PLAIN_INK for unassociated and unrecognizable ink (graphics and sketches), CURSIVE_INK for ink recognized to be cursive text. The position attribute just indicates if the annotation position is relative with some HTML element or if it is the absolute position when first rendered in a browser. There are other child elements within each annotation with obvious values. The WINDOW child of an ANNOTATION element gives an indication of the window size and client area of the document when the annotation occurred. The attributes of the INKSTRING element give the characteristics of ink, namely the time for sketching excluding pen-up time (SAMPLERTIME attribute) and the number of inking points (NUM attribute) to be parsed from the string representation.

The REFTEXT element of a TEXT_INK annotation is populated with the RANGE children that just contain anchor text from the text-range array. The LINK child if populated gives an indication that the entire annotation is linked to point to another resource that could be an URL or an ID of another annotation. Every annotation on the basis of its attributes can be hashed to a unique ID that is stored as an ID child element in the annotation itself and which can be used to address the annotation. This could help in linking Ink Annotations among themselves and also to document URLs.

The CURSIVE_INK annotations also could have the same child elements as TEXT_INK annotations, as they can also be associated semantically to document elements. But the main distinction is the child element CURSIVETEXT that would contain recognized text. The PLAIN_INK annotations are the ones that cannot be recognized as any shape or any text and also cannot be associated to any document text and elements. As such, the fields would be the same as TEXT_INK annotations except for the REFTEXT child element. They have an absolute position attribute and can statically be positioned at the same point in a browser window.

(2) Ink Retrieval

Whenever a page is loaded into the browser, the corresponding event from the DOM invokes the retrieval handler. From the stored XML file as shown by the schema in FIG. 7B, the URL presence is checked in all REFURL tags, and the available ink, style, reference position, and the text string attributes are read from each confirming annotation element. The strings are parsed into values and populated in runtime annotation objects. The occurrence-counts (OC) or rank of the text strings within the XML annotation file (The OC attributes of RANGE elements) are also found. Now, the loaded document can be searched for the particular ranges using DOM element access and walk-through methods. From the boundary rectangles of the text ranges, the reference point for plotting ink is obtained. Using a simple shift of origin from the REFPOS reference element and the current reference point, ink can be plotted onto the document. This methodology is dynamic and hence it works in conditions such as a browser window resize.

It is contemplated that the ink part of the annotation may be shown or hidden within the current document if text ranges are absent due to modification of the document or if the bounding rectangles of the ranges do not match up with the area covered by the bounding rectangle of the ink. The latter case occurs when text ranges wrap around during the rendering. The ink associated linked text ranges are normally rendered in some changed format than their normal-render method so as to show the association. The presently preferred implementation changes the background or the bold, italic attributes of the text as soon as the association is complete.

V. A Preferred Embodiment

Having described the details of implementing various aspects of the present invention, a preferred embodiment will now be described in reference to FIGS. 8-8D and 9-9C. The following description of the preferred embodiment will not discuss specific details of implementation, but rather show one particular embodiment of the present invention. Thus, details concerning what web browser is being used, or under what operating system the web browser is working, or what type of web page is being annotated, or what device the user is using to input the digital ink, etc., are not discussed below, as these details are not directly germane to the present invention (in the sense that these details are open to immense variation, and the present invention may be applied to any combination within that immense variety). The presently preferred embodiment below assumes a user has input a digital ink annotation of a web page in a web browser.

Figure 8:
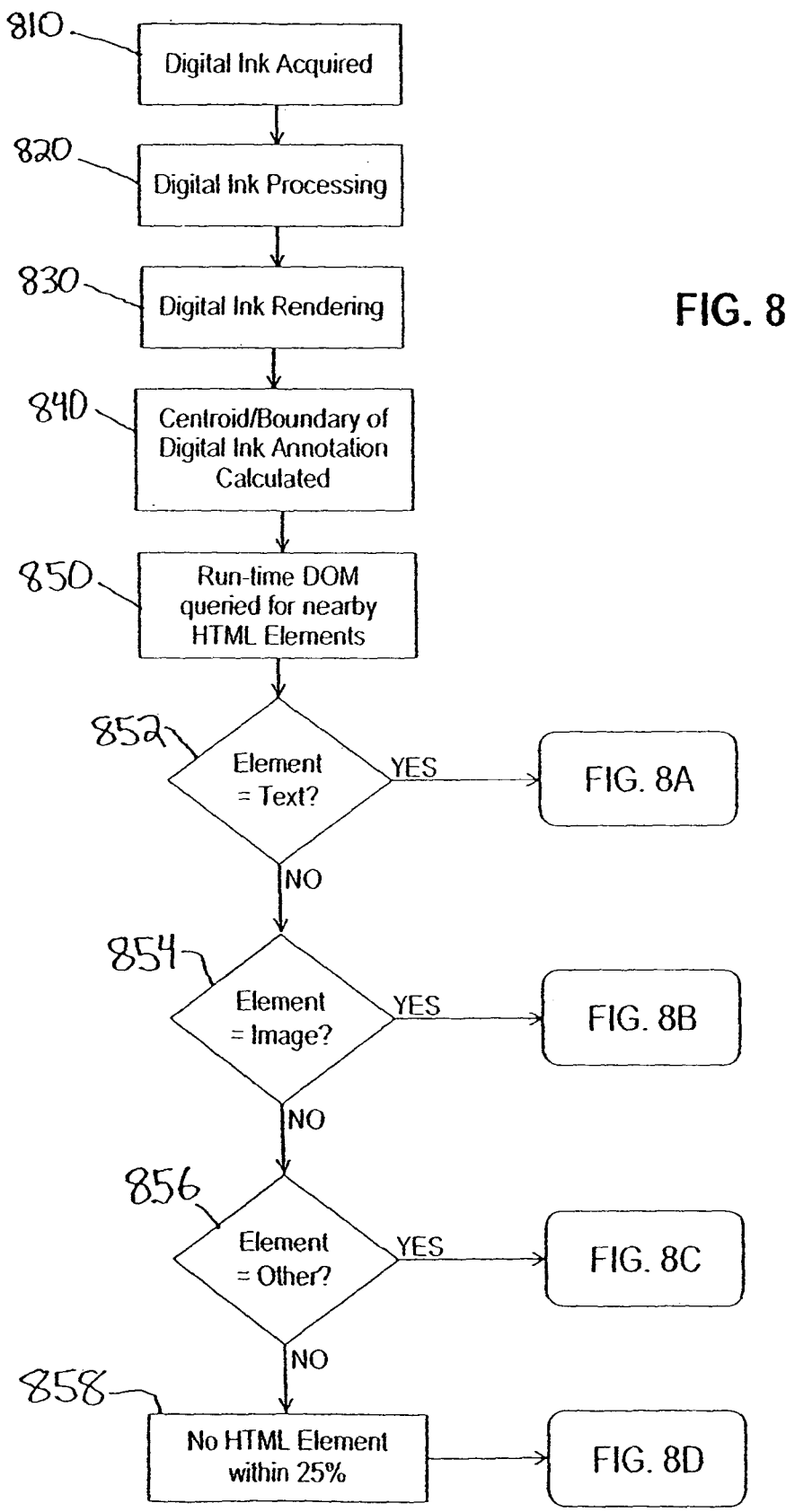
FIG. 8 is a flowchart showing a method for performing Ink Capture & Rendering, Ink Understanding, and Ink Storage according to a presently preferred embodiment of the present invention.

In step 810 of FIG. 8, the digital ink is acquired by the system, as discussed in Sect. II above. In step 820, the ink coordinates comprising the acquired digital ink are processed, which includes smoothing out the lines and compressing the number of points comprising the lines, as also discussed in Sect. II above. In step 830, the processed points comprising the digital ink are rendered on the browser, as further discussed in Sect. II above.

In the next steps of FIG. 8, the anchor in the web page for the digital ink annotation is discovered and then appropriately associated and stored with the digital ink annotation. By referring to the associated anchor, the digital ink annotation can be appropriately reproduced when it is retrieved from memory. In step 840, the boundary and centroid of the digital ink annotation is computed. The run-time DOM of the web page is then queried in order to determine the HTML elements that are located at and around the centroid in step 850. After the DOM has determined the elements, a series of filtering subroutines are performed in order to find the appropriate annotation anchor for the digital ink annotation. If the element is a text element, the method branches, in step 852, to the procedure which is shown and explained below in reference to FIG. 8A. If the element is an image element, the method branches, in step 854, to the procedure shown in FIG. 8B. If the element is another type of HTML element, such as a SPAN, a TABLE, a FORM, etc., the method branches, in step 856, to the procedure shown in FIG. 8C. If no elements are found within a 25% boundary of the digital ink annotation (i.e., within a region comprising 25% of the web page around the digital ink annotation), the method branches, in step 858, to the procedure shown in FIG. 8D.

Figure 8B:
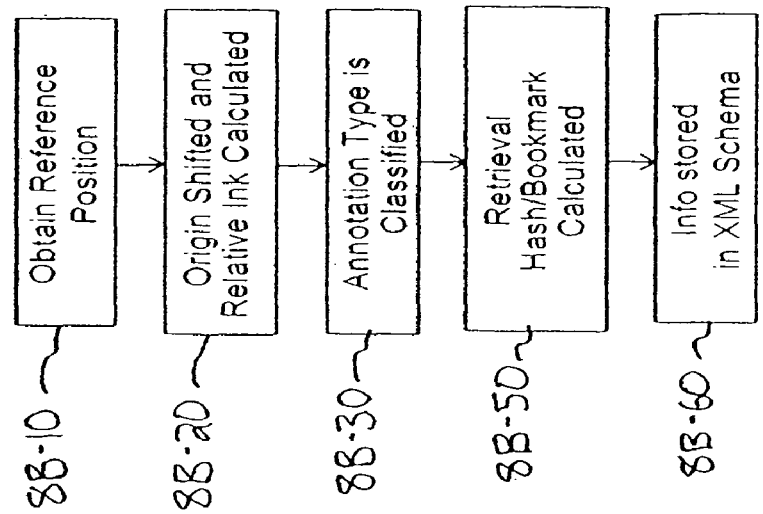
FIG. 8B is a flowchart showing a method for finding an image element to serve as an annotation anchor for the digital ink annotation according to a presently preferred embodiment of the present invention.
Figure 8A:
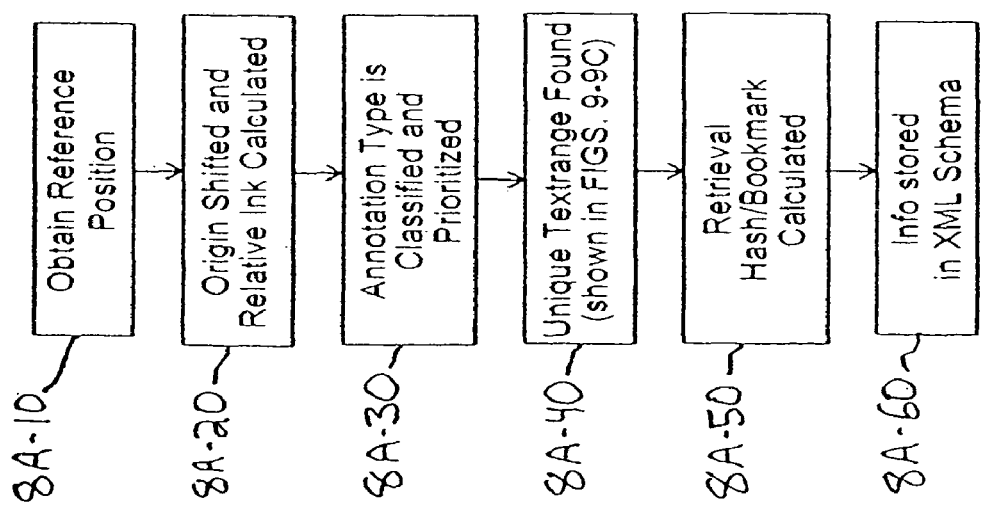
FIG. 8A is a flowchart showing a method for finding a text range in a text element to serve as an annotation anchor for the digital ink annotation according to a presently preferred embodiment of the present invention.

The procedure for associating a text element on the web page with the digital ink annotation is shown in FIG. 8A. In step 8A-10, the reference position of the text range element is obtained. The origin is then shifted to this position and the relative ink (i.e., the relative position of the digital ink annotation in relation to the text range element) is calculated in step 8A-20. The annotation type (e.g., margin, underline, enclosure, pointer/link, indefinite, etc.) is classified based on the shape and position of the digital ink annotation in step 8A-30. In step 8A-40, a unique text range is found on the web page to use as the anchor for the digital ink annotation. A text range filtering procedure is shown and explained below in reference to FIGS. 9-9C. Once a unique text range is selected, a retrieval hash or bookmark is calculated based on the traversal path to the selected text range element in step 8A-50. Finally, in step 8A-60, the absolute reference position obtained in step 8A-10, the relative ink calculated in step 8A-20, the annotation type determined in step 8A-30, and the bookmark or retrieval hash calculated in step 8A-50 are stored within the XML annotation schema as shown in Sect. IV above.

The procedure for associating an image element on the web page with the digital ink annotation is shown in FIG. 8B. In step 8B-10, the reference position of the text range element is obtained. The origin is then shifted to this position and the relative ink is calculated in step 8B-20. The annotation type of the image (e.g., enclosure, pointer/link, indefinite, etc.) is classified based on the shape and position of the digital ink annotation in step 8B-30. After this, a retrieval hash or bookmark is calculated based on the traversal path to the selected text range element in step 8B-50. Finally, in step 8B-60, the absolute reference position obtained in step 8B-10, the relative ink calculated in step 8B-20, the annotation type determined in step 8B-30, and the bookmark or retrieval hash calculated in step 8B-50 are stored within the XML annotation schema as shown in Sect. IV above.

Figures 8C, 8D:
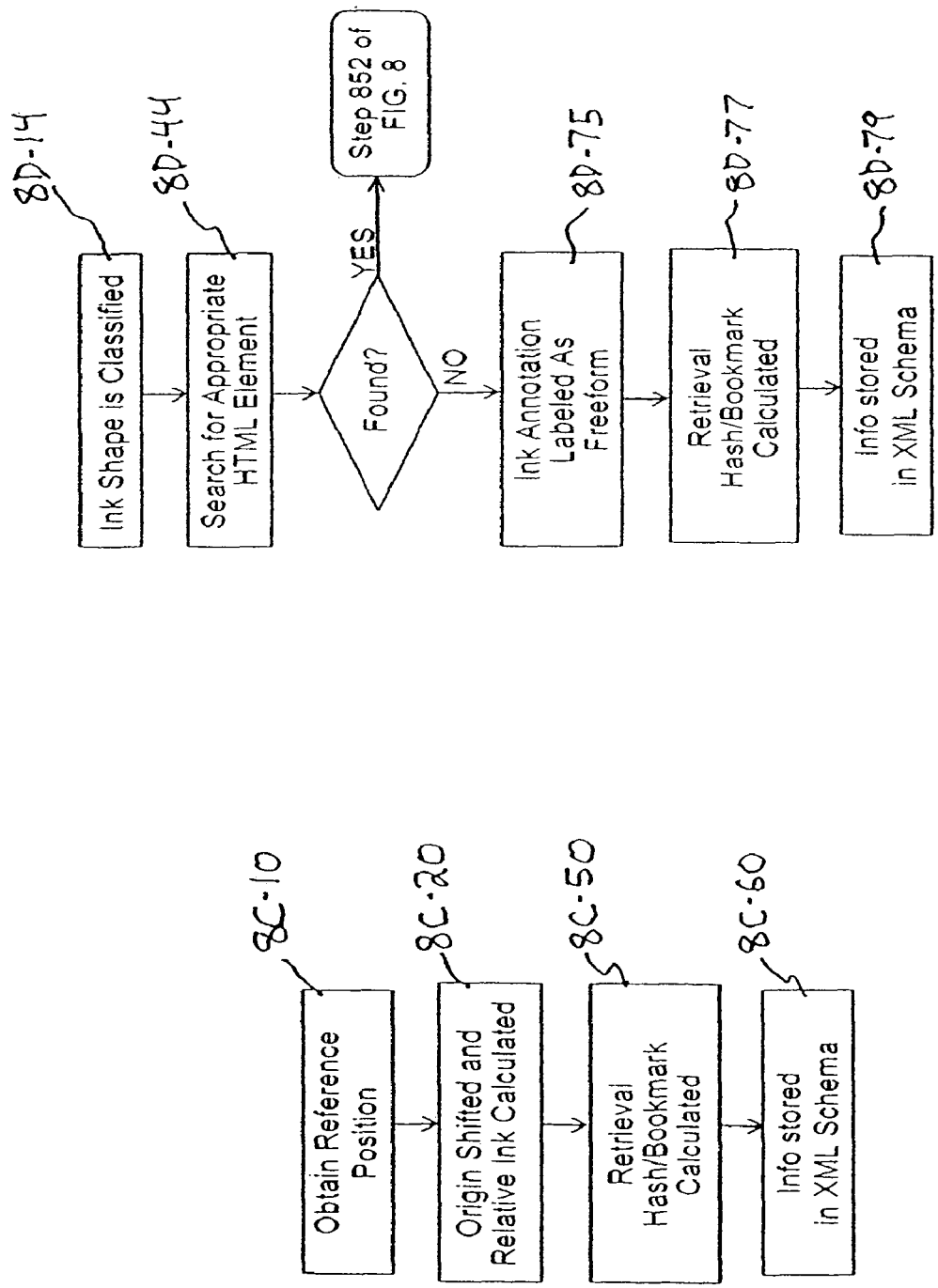
FIG. 8C is a flowchart showing a method for finding a non-text and non-image element to serve as an annotation anchor for the digital ink annotation according to a presently preferred embodiment of the present invention.
FIG. 8D is a flowchart showing a method for finding any element to serve as an annotation anchor for the digital ink annotation according to a presently preferred embodiment of the present invention.

The procedure for associating a non-text and non-image element on the web page with the digital ink annotation is shown in FIG. 8C. In step 8C-10, the reference position of the text range element is obtained. The origin is then shifted to this position and the relative ink is calculated in step 8C-20. A retrieval hash or bookmark is calculated based on the traversal path to the selected text range element in step 8C-50. In step 8C-60, the absolute reference position obtained in step 8C-10, the relative ink calculated in step 8C-20, and the bookmark or retrieval hash calculated in step 8C-50 are stored within the XML annotation schema as shown in Sect. IV above.

The procedure for associating an element on the web page with the digital ink annotation if no elements have been found within a 25% boundary is shown in FIG. 8D. In step 8D-14, the shape of the digital ink annotation is classified as one of the following annotation types: underline, margin, enclosure, pointer, or undefined. In step 8D-44, a search to find appropriate elements is performed based on the type of annotation. For example, if the annotation type is underline or margin, the text elements nearest to the digital ink annotation are found. If an appropriate element for the type of annotation is found, the process returns to step 852 in FIG. 8 so that the appropriate filter can be used on the found element (i.e., if a text element, the text element filter is used).

If no anchor is found in step 8D-44, which would also mean no annotation anchor had been found in steps 852, 854, and 856 in FIG. 8, the subroutine shown in steps 8D-75, 8D-77, and 8D-79 is performed. In step 8D-75, the digital ink annotation is labeled as a freeform annotation. The absolute ink (i.e., the absolute position, the position of the digital ink annotation relative to the web page itself) is calculated in step 8D-77, and then stored in step 8D-79 within an XML annotation schema.

Figure 9A:
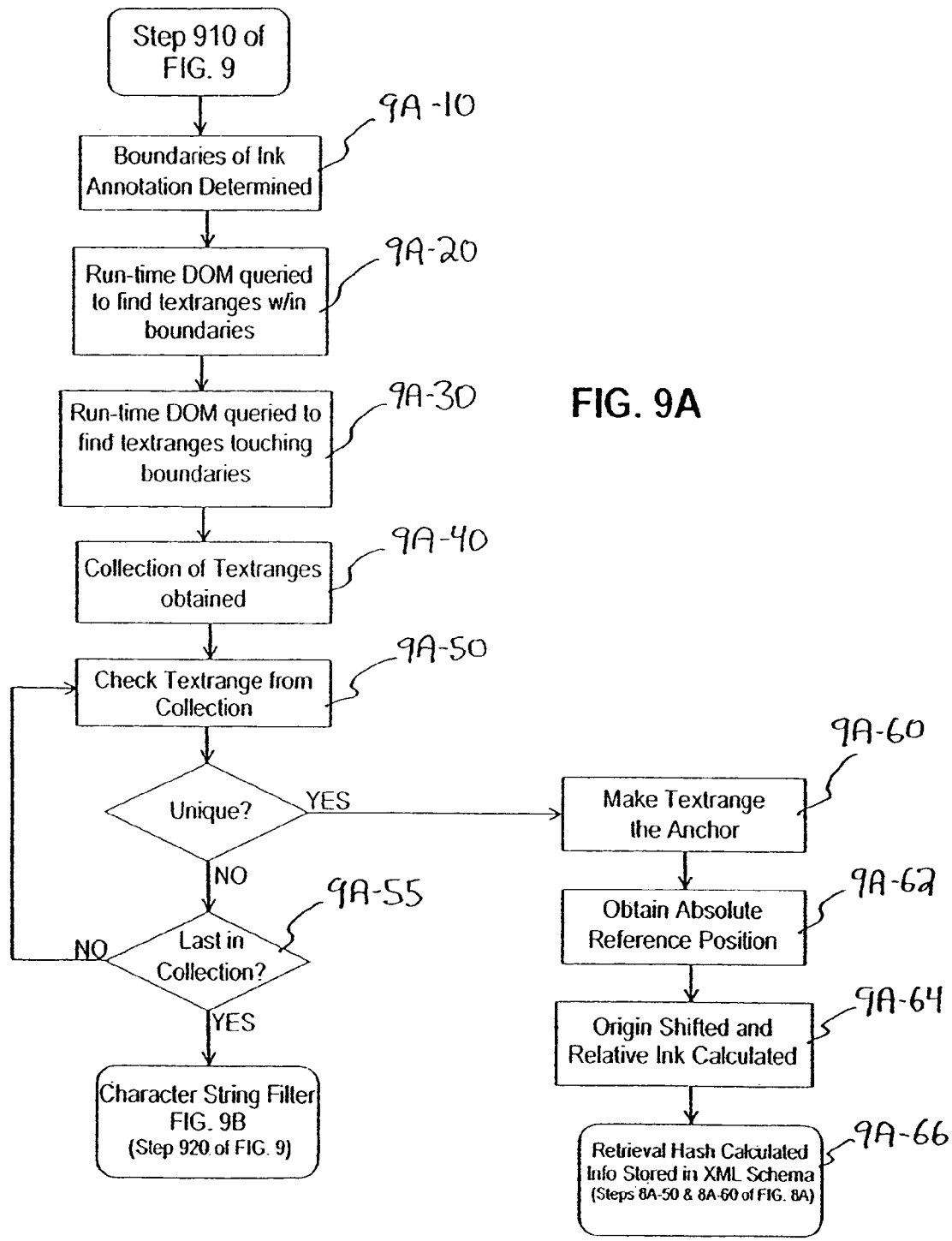
FIG. 9A is a flowchart showing a WORD filter method to be used in the method of FIG. 9, according to a presently preferred embodiment of the present invention.
Figure 9B:
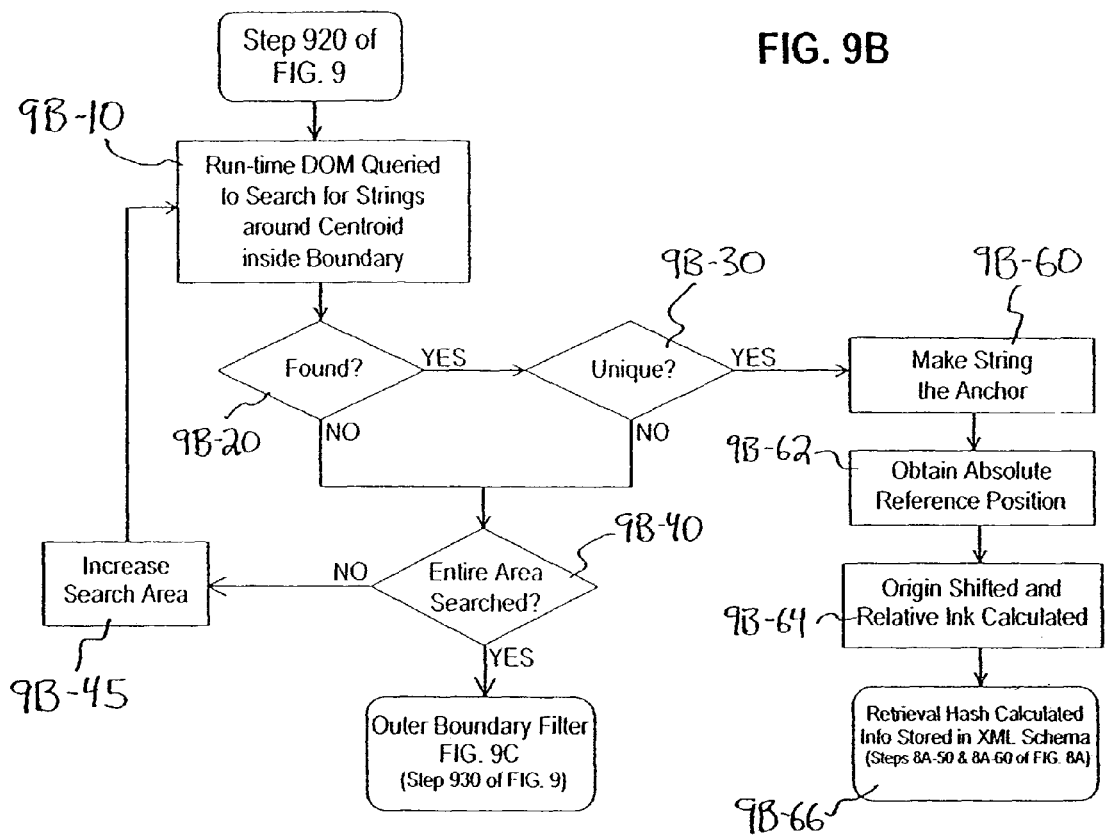
FIG. 9B is a flowchart showing a CHARACTER string filter method to be used in the method of FIG. 9, according to a presently preferred embodiment of the present invention.
Figure 9C:
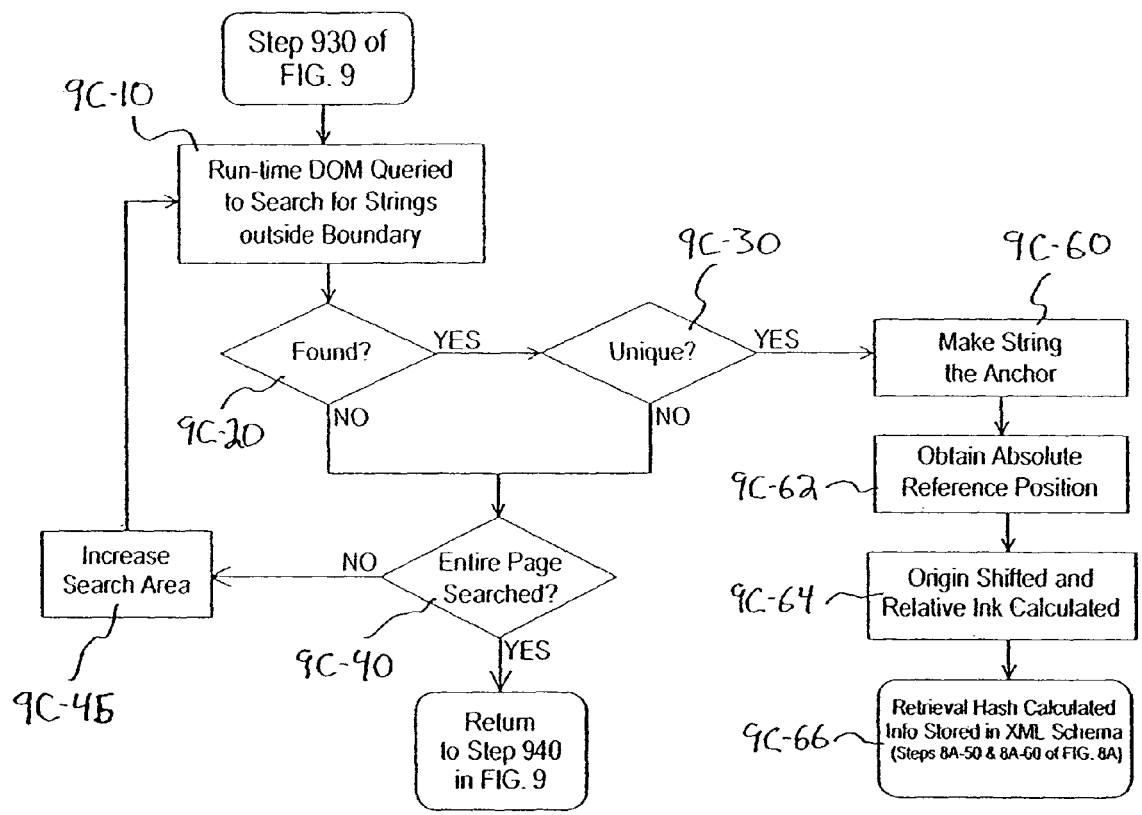
FIG. 9C is a flowchart showing an Outside Ink Boundary filter method to be used in the method of FIG. 9, according to a presently preferred embodiment of the present invention.

FIGS. 9-9C show an exemplary text range filtering procedure which can be used in step 8A-40 of FIG. Z1. FIG. 9 show how the series of filters is applied in order to find a unique text range. In step 910, the Word String Filter (which will be shown and described below in reference to FIG. 9A) is applied to the text element which was found in step 852 of FIG. 8. If no unique text range is found with the Word String Filter, the Character String Filter (which will be shown and described below in reference to FIG. 9B) is next applied to the text element in step 920. If no unique text range is found with the Character String Filter, the Outside Boundary Filter (which will be shown and described below in reference to FIG. 9C) is next applied in step 930 to the entire web page on which the text element is located. If no unique text range is found with the Outside Boundary Filter in step 930, the text range located at the centroid of the digital ink annotation is used as the annotation anchor in step 940. The run-time DOM of the web page is used to find the occurrence count of the non-unique text range being used as the annotation anchor within the web page in step 950. In step 960, the anchor annotation text is stored along with the occurrence count.

The Word String Filter is shown in FIG. 9A. In step 9A-10, the boundaries of the digital ink annotation are determined. The run-time DOM of the web page is then queried in order, in step 9A-20, to find the text ranges within the boundaries determined in step 9A-10. In step 9A-30, the run-time DOM is queried in order to find with WORD level granularity text ranges which touch the boundaries of the digital ink annotation (i.e., if a block of text is circled, this step finds any words which the circle itself touches or is drawn through) words. In step 9A-40 a collection of text ranges are obtained. In step 9A-50, a text range within the collection is checked to determine whether it is unique within the entire run-time DOM of the web page. If the text range is unique, it is made the anchor for the digital ink annotation in step 9A-60. The absolute reference position of the anchor is calculated in relation to the top left border of the web page in step 9A-62. The origin is shifted to the position calculated in step 9A-62 and the relative ink is determined in step 9A-64. Lastly, the filter returns, in step 9A-66, to the process shown in FIG. 8A (at step 8A-50). If the text range is determined to not be unique in step 9A-50, the filter determines whether the text range is the last in the collection in step 9A-55. If it is, the filter stops and the procedure continues with the Character String Filter in FIG. 9B. If it is not, the filter returns to step 9A-50 to check the next text range in the collection.

The Character String Filter is shown in FIG. 9B. In step 9B-10, the filter uses the run-time DOM of the web page to search using CHARACTER level granularity for character strings in the vicinity of the centroid of the digital ink annotation. It is determined whether a character string is found in step 9B-20. If a character string is found, it is checked to see whether it is unique within the entire run-time DOM of the web page in step 9B-30. If the character string is unique, it is made the anchor for the digital ink annotation in step 9B-60. After that, in a manner similar to steps 9A-62 to 9A-66 in FIG. 9A, the absolute reference position of the anchor in the web page is calculated in step 9B-62, the relative ink is determined in step 9B-64, and the filter returns, in step 9B-66, to the process shown in FIG. 8A (at step 8A-50). It is possible for the Character String Filter to end up with a character string which extends outside the boundary of the digital ink annotation.

If the character string is determined to not be unique in step 9B-30, or if a character string is not found in step 9B-20, it is determined whether the entire inside of the digital ink annotation has been searched in step 9B-40. If the entire inside has not been searched, the filter expands the search area outside the search area previously searched (in this case, outside the vicinity of the centroid of the digital ink annotation) in step 9B-45. After the search area is expanded, the filter returns to step 9B-10 to use the run-time DOM of the web page to search using CHARACTER level granularity for character strings in the new search area. Then the process repeats. If it is determined that the entire area was searched in step 9B-40, the filter stops and the procedure continues with the Outside Boundary Filter in FIG. 9C.

The Outside Boundary Filter is shown in FIG. 9C. In step 9C-10, the filter uses the run-time DOM of the web page to search using CHARACTER level granularity for character strings in the vicinity of the boundary of the digital ink annotation. It is determined whether a character string is found in step 9C-20. If a character string is found, it is checked to see whether it is unique within the entire run-time DOM of the web page in step 9C-30. If the character string is unique, it is made the anchor for the digital ink annotation in step 9C-60. After that, in a manner similar to steps 9A-62 to 9A-66 in FIG. 9A, the absolute reference position of the anchor in the web page is calculated in step 9C-62, the relative ink is determined in step 9C-64, and the filter returns, in step 9C-66, to the process shown in FIG. 8A (at step 8A-50). If the character string is determined to not be unique in step 9C-30, or a character string is not found in step 9C-20, it is determined whether the entire web page has been searched in step 9C-40. If not, the filter expands the search area outside the search area previously searched (in this case, outside the vicinity of the boundary of the digital ink annotation) in step 9C-45. Then the filter returns to step 9C-10 to use the run-time DOM of the web page to search using CHARACTER level granularity for character strings in the new search area. If it is determined that the entire web page has been searched in step 9C-40, the filter stops and the procedure continues with step 940 in FIG. 9.

The preferred embodiment of the present invention described in reference to FIGS. 8-8D and FIGS. 9-9C is intended to serve as an example, and is by no means intended to limit the present invention to the order, the number, or overall structure of steps in FIGS. 8-8D and FIGS. 9-9C. As would be known to one skilled in the art, the steps in the presently preferred embodiment may be performed in a different order, or some steps may be combined, or a single step separated into two or more parts. Furthermore, steps may be replaced with other steps. For instance, another embodiment might use another locus besides the centroid, or might only look for text elements as anchors, or might use other sorts of elements, whether in markup language or not, as anchors, etc. The possibilities of the variations are countless, as would be known to one skilled in the art.

As has been mentioned above, the present invention is platform-independent. Furthermore, the present invention may be applied to any type of browser, not merely web browsers, because, as discussed in the Background section, browsers can be and will be portals to any type of data and even active files (executables), as well as a powerful processing means (or frameworks) for acting upon data. The present invention is intended to be implemented in any existing and future browsers in any present or future operating system.

In terms of the client-server architectural model, the preferred embodiment of the present invention should be understood as being implemented on the client side. To be more exact, the browser client (and modules interacting with the browser client) perform the steps of the present invention. However, it should be noted that it is possible for a proxy server located between the browser client and the server to perform some or all of the method steps in accordance with another embodiment of the present invention. For example, either in a private intranetwork or the public Internet, a centralized proxy server could perform some of the steps in FIG. Z, and/or store the digital ink annotations for various groups or individuals.

Furthermore, the present invention could be extended to include online web collaboration where users make digital ink annotations on shared documents. Using encryption for privacy, the digital ink annotations could be sent over a LAN or the Internet. A helper application could serve as a annotation server hub at one end with multiple spokes as the browser clients. In one contemplated embodiment, the stored XML annotation layer could be transferred to another device through HTTP using standard protocols like Simple Object Access Protocol (SOAP) for XML transfer.

Normal web servers could be developed as digital ink annotation servers with authentication and group information. This is ideal in a LAN setting where the annotation server collects the local annotations with user and group permissions, and disburses the annotation layer on query by the user or automatically. Here again, the XML/SOAP combination could be used.

In the presently preferred embodiment, the annotation layer is composed of a special set of XML tags that, when combined with an HTML source file, dictate which parts of the HTML document should be clipped. While annotation can handle most common clipping tasks, it may not always provide the capability or flexibility required. With annotation, the changes that can be made to the DOM are limited by the capabilities provided by the annotation language. This is where text clipping using ink can be of use. Ink retains the spatial data, so virtually any portion of the document can be clipped into fragments for smaller devices.

The W3C Resource Description Framework (RDF) provides a highly general formalism for modeling structured data on the Web. In particular, the RDF Model and Syntax specification defines a graph-based data structure based around URI resource names, and an XML-based interchange format. Thus, it could help to convert one annotation format in XML to a different format. By developing the RDF schema for the XML annotation layer described herein, it would be possible to make digital ink annotations truly universal.

VI. Multi-Modal Inking

In accordance with another preferred embodiment of the invention, digital ink is captured using an input device (not shown), such as a digitizer attached to the serial port of the computer. Alternatively, the digital ink is located based on mouse coordinates that are detected and drawn on the display screen of such computing devices. Here, a system and method is provided for (i) automatic detection of particular types of information when present in a document (e.g., web page) being loaded into a browser, such as a web browser; (ii) changing the appearance of any detected instances of the particular types of information on the loaded document so as to call the attention of the viewer (i.e., the browser user) to them; (iii) performing, or initiating, a desired operation upon any one instance of the particular types of information on a loaded document with only one or two actions on the viewer/user's part; and (iv) capturing, storing and streaming ink.

The desired operations may include at least one of the following: storing the detected instances of the particular types of information in memory locations designated for those types of data; transmitting the detected instances of the particular types of information to a designated piece of hardware or software in order that the designated piece of hardware/software perform a desired action either with the detected instances or upon the detected instances; and providing the user/viewer with a number of options of what action to perform with or upon the detected instances.

In accordance with the present preferred embodiment, telephone numbers on downloaded web pages are detected and highlighted when displayed in the web browser. The user may click on one of the highlighted telephone numbers to perform some sort of action, e.g., initiate a telephone call, store the telephone number in an address book, or place it in temporary storage for immediate retrieval.

Here, any detected telephone numbers are highlighted in the opened computer document in order to indicate to the user that additional functionality is available for the detected telephone numbers. The document user may indicate on the document certain action(s) to be performed using the highlighted telephone number. As an example, a left mouse-click on a highlighted telephone number could initiate a call to that number, or a right-click could cause a pop-up menu to appear and present various options of actions/choices associated with the telephone number. In this context, "left-click" and "right-click" refer to a computer user placing a cursor over a specific area on a computer screen and depressing either a left-hand button or a right-hand button, respectively, on a computer 'mouse'.

In alternative embodiments, there may be only one button on the computer mouse, and, instead of a right-click and a left-click, the user may depress the single mouse button either once or twice in rapid succession to indicate either making a call or seeing a menu of choices, respectively. In other embodiments, the user may have a means that can only indicate a single type of selection, in which case the user will preferably be presented with a menu of choices. Although the presently preferred embodiments are described in terms of a right and left-click mouse, any means of selecting an item on the computer screen may be used, for example, a touchpad, a keyboard, a joystick, voice command, etc., as would be understood by one skilled in the art.

A detailed description of the automatic detection and dialing of phone numbers on web pages is described in Applicants' co-pending application Ser. No. 10/697,468 and 11/191,700 which were filed with the U.S. Patent and Trademark Office on Oct. 30, 2005 and Jul. 28, 2005, respectively, and which are incorporated herein by reference in their entirety.

Figure 10A:
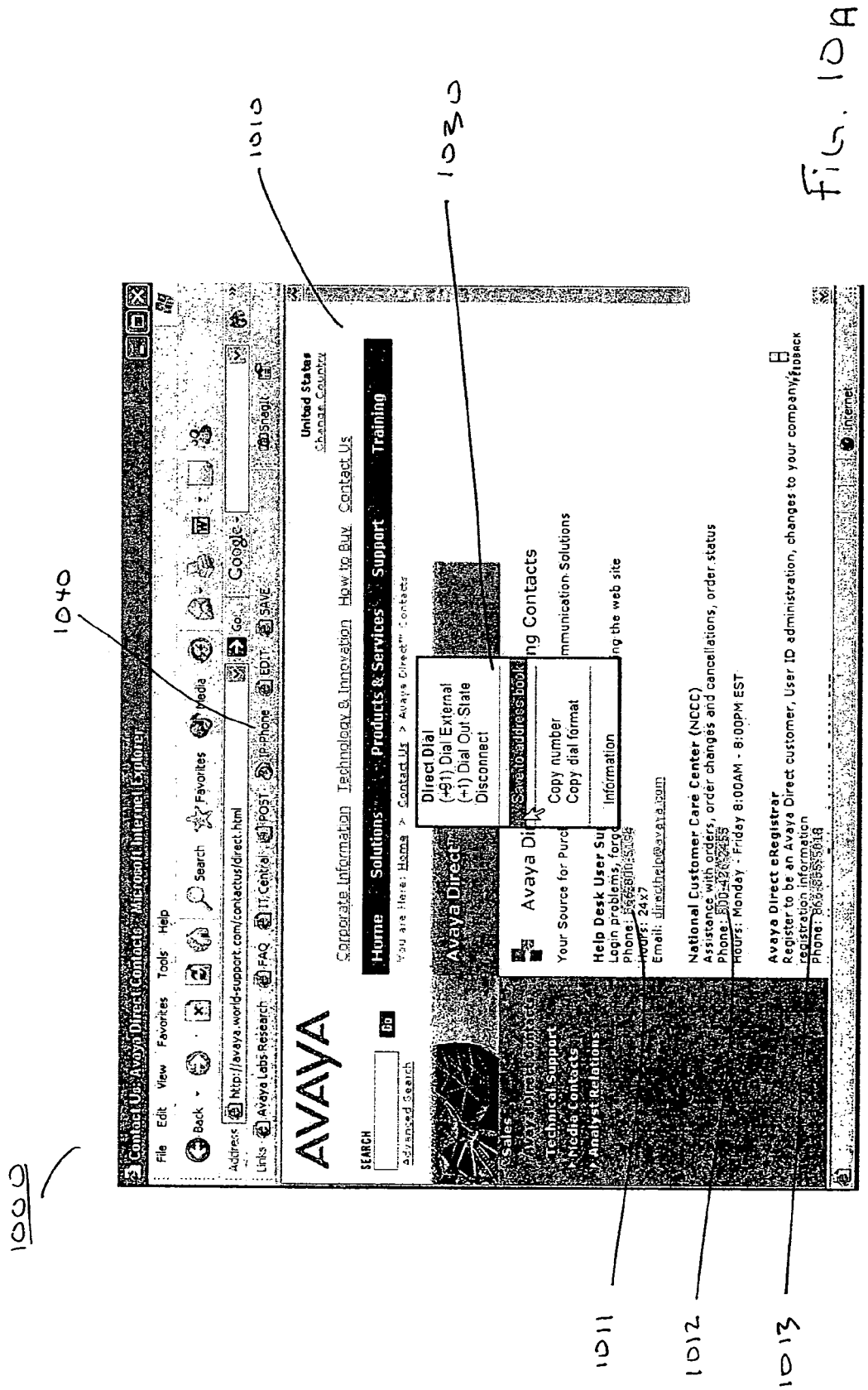
FIG. 10A is an exemplary illustration of a web page in a web browser GUI having highlighted telephone numbers with provided functionality in accordance with a preferred the invention.
Figure 10B:
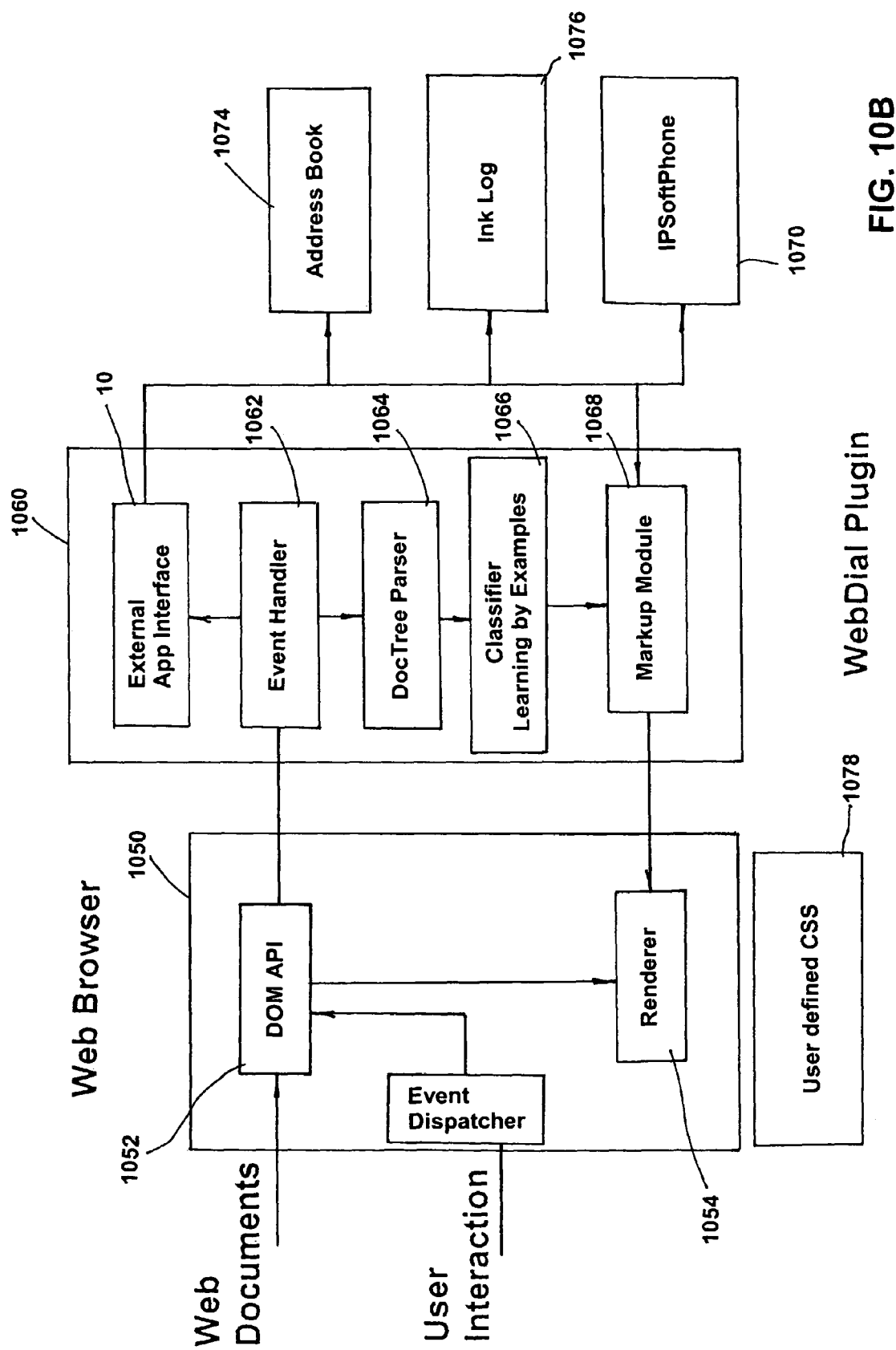
FIG. 10B is a schematic block diagram of a system for detecting, capturing, storing and associating ink with particular types of information in accordance with the present invention.

Referring to FIGS. 10A-10B, the computer document is a markup language document, such as a web page, which is opened in a browser. The markup language document is, for example, a HyperText Markup Language (HTML) document, but the present embodiment may be applied to any type of markup language document. The "hypertext" in HTML refers to the content of web pages—more than mere text, hypertext (sometimes referred to as "hypermedia") informs the web browser how to rebuild the web page, and provides for hyperlinks to other web pages, as well as pointers to other resources. HTML is a "markup" language because it describes how documents are to be formatted. Although all web pages are written in a version of HTML (or other similar markup languages), the user never sees the HTML, but only the results of the HTML instructions. For example, the HTML in a web page may instruct the web browser to retrieve a particular photograph stored at a particular location, and show the photograph on a display in the lower left-hand corner of the web page. The user, on the other hand, only sees the photograph in the lower left-hand corner of the display. HTML is also a variant of eXtensible Markup Language (XML). One difference between HTML and XML is that HTML was designed to display data and focus on how data looks, whereas XML was designed to describe data and focus on what data is. XML is a cross-platform, extensible, and text-based standard for representing data.

In FIG. 10A, a depiction of a GUI window 1000 of a standard web browser (in this case, Internet Explorer) is shown with a loaded web page 1010. In FIG. 10A, there is a 'bookmarklet' 1040 labeled "IP-Phone" in the Links toolbar at the top of the web browser GUI; this bookmarklet 1040 can be used to turn the Web-Dial functionality on or off. When the Web-Dial functionality is turned off, the telephone numbers are not highlighted or indicated in any way (i.e., the web page appears as it would appear in a standard, prior art web browser). Because the Web-Dial functionality has been turned on in FIG. 10A, web page 1010 has been parsed and the detected telephone numbers are highlighted, as shown in FIG. 10A. Specifically, three telephone numbers 1011, 1012, and 1013 are highlighted on web page 1010.

In accordance the present embodiment, when the cursor is located over a highlighted telephone number, it changes from its usual arrow shape to an icon indicating that particular functionality is available for the highlighted telephone number if the user right- or left-clicks. In FIG. 2A, the user has right-clicked highlighted telephone number 1011, thereby causing menu 1030 to appear. If the user had left-clicked, the highlighted telephone number 1011 would have been extracted and sent to an IP telephony program.

Although pull-down menu 1030 is shown immediately above and to the right of highlighted telephone number 1011 in FIG. 10A, pull-down menu 1030 may appear at other positions on the computer screen. The options presented to the user in pull-down menu 1030 of FIG. 10A are "Direct Dial", "(+1) Dial External", "(+1) Dial Out State", "Disconnect", "Save to address book", "Copy number", "Copy dial format", and "Information". In FIG. 10A, the user has moved the cursor to select the "Save to address book" option in pull-down menu 1030. The first three options in pull-down menu 1010 are self-explanatory.

"Disconnect" lets the user disconnect the phone line on completion of a telephone call. This function would be grayed-out when the user initially selects the highlighted telephone number, as there would be no connection yet. Of course, it is also possible that after finishing a call using the IP telephony program, the user may disconnect using the IP telephony program. "Copy number" copies the number into the computer's clipboard for later use by the user. "Copy dial format" indicates that the format of the highlighted telephone number is a format that should be searched for in the future. "Information" provides information about the web-dial functionality. The "Copy Dial Format" provides the ability to learn. In accordance with the present embodiment, feedback received from the user can be used to modify or add to the search method used to detect any instance of a telephone number.

It should be understood that the user options shown in the pull-down menu of this exemplary GUI are exemplary, and that many variations regarding the options are possible: there may be greater or fewer options, or different options, such as reverse telephone number lookup, which would access a reverse phone lookup directory to verify or to obtain the address and name associated with the highlighted telephone number.

FIG. 10B is a schematic block diagram of a system for detecting, capturing, storing, streaming and associating ink with particular types of information. Web documents are processed by the Document Object Model (DOM) application programming interface (API) 1052 of a web browser 1050 to provide a model of how the various objects of the document are related to each other. As shown in FIG. 10B, a web browser 1050, such as Internet Explorer, receives web documents and user input or interaction. WebDial Plugin 1060 is a Browser Helper Object (BHO) that is loaded and initialized whenever a new instance of web browser 1050 is started. BHOs, such as WebDial Plugin 1060, are Dynamic Link Libraries (DLLs) which run in the same memory context as web browser 1050 and can perform any action on the available windows and modules. The WebDial Plugin 1060 is typically unloaded when the instance of web browser 1050 is closed, although this may not be true for all cases.

Event Handler 1062 in WebDial Plugin 1060 listens for events occurring in web browser 1050. Specifically, the Event Handler 1062 listens for two events that are generated by web browser 1050 at specific times: the DocumentComplete event which is generated when a web document, with all of its forms, has fully loaded into the browser; and the BeforeNavigate event which is generated when the user has performed an action which seems to require that a new web document be loaded into the web browser. Such user actions include clicking the Back or Forward buttons, or entering a new URL into the navigation bar.

If a DocumentComplete event is detected, the remaining modules in WebDial Plugin 1060 are activated. Specifically, DocTree Parser 1064 parses the run-time Document Object Model (DOM) of the downloaded document through the DOM application programming interface (API) 1052. The Document Object Model (DOM) is a platform and language-neutral API standard that allows programs and scripts to dynamically access and update the content, structure, and style of documents (both HTML and XML). Using DOM API 1052, a document can be further processed and the results of that processing can be incorporated back into the page presented to the user by the renderer 1054. In essence, the DOM API provides a tree-like model, or framework, of the objects in a document, i.e., when an XML/HTML document is loaded into an application (such as a web browser like Internet Explorer), the DOM API creates a DOM of the downloaded document in the form of an in-memory tree representation of the objects in that document. Using the DOM API, the run-time DOM may be used to access, traverse (i.e., search for particular objects), and change the content of the downloaded document.

Parser 1064 parses the DOM of the downloaded document to find any instances of telephone numbers. Specifically, parser 1064 uses regular expression parsing rules and detects the various formats that phone numbers can possess within a computer document. For example, North American based telephone numbers could be parsed into three groups comprised of a first group of three digits for an area code, a second group of three digits for an exchange, and a third group of four digits for an extension. Once parser 1064 has completed its task, the results, if any, are output to classifier 1066.

Classifier 1066 extracts "lexicalized" contextual features for each result, i.e., for each possible telephone number in the computer document, local features are extracted to determine the likelihood that the parser-selected number is indeed a telephone number. For example, if the possible telephone number is preceding by certain keywords, such as "telephone", "phone", "mobile", "cell", and "fax", it strongly indicates that the current number is in fact a phone number. As another example, icons, such as a telephone image, may also increase the likelihood that the number is a telephone number. Additional search parameters are possible, such as the formatting of the page around the number (e.g., if it appears to be part of a contact block on that webpage), and other terms and icons, when searching for instances of telephone numbers, as would be known to one of ordinary skill in the art.

The classifier 1066 can be pre-trained (i.e., before installation) by performing statistical analyses of web pages, and specifically the typical format of, and the contextual features around, telephone numbers found therein. It's also possible that the classifier 266 can be trained by the particular user of the WebDial Plugin 1060, by having a web interface for the user to identify telephone numbers (and telephone number formats and contexts), and thereby train, the classifier 1066 in WebDial Plugin 1060. Preferably, a Support Vector Machine is used as classifier 1066. However, any conventional classifier can be used, as would be known to one of ordinary skill in the art. Even without an entire user training web interface, classifier 266 can receive feedback from the user and then use that feedback in order to modify or add to the search method used to detect any instance of a telephone number. Furthermore, it is contemplated that search parameters may be under the control of the user, e.g., the user may have the ability to turn on and off certain search parameters, in addition to the user defining words, terms, formats, or contexts to look for in the web page.

Having analyzed the output of parser 1064 to determine which of the parsed telephone numbers is most likely to be a telephone number, classifier 1066 then outputs the most likely numbers to be telephone numbers to Markup Module 1068, which ensures that these most likely telephone numbers in the downloaded document are highlighted and made clickable.

Markup Module 1068 creates a span tag which is placed around the telephone number in the downloaded document. The span tag is used in HTML to group inline-elements together in order to apply specific style and/or event attributes to the elements within the "span". In this case, the span tag indicates that the grouped elements, i.e., the numbers making up the phone number, will be highlighted and active upon the occurrence of certain cursor events. Specifically, when the cursor is over the highlighted area, the cursor turns into a telephone icon; when the highlighted phone number is left-clicked, it is interpreted as a hyperlink click which is intercepted by Event Handler 1062 and results in the IP telephony program 1070 being called; and, when the highlighted phone number is right-clicked, the pull-down menu 1030 of options in FIG. 10A is displayed.

If a click is made over one of the phone number span tags, a new type of URL is captured by the BeforeNavigate event. In accordance with the specific implementation of the present embodiment, the inventive format of this new "phone" URL comprises "phone://<stripped telephone number>". In other words, the mouse click is interpreted by the web browser as a navigation event, i.e. a call to load another web page, and thus the web browser begins the process of navigating to the page indicated by the mouse click, but instead of a conventional URL, the new inventive phone URL is captured by the BeforeNavigate event, which, in turn, is intercepted by Event Handler 1062.

If a BeforeNavigate event is intercepted by Event Handler 1062, WebDial Plugin 1060 intercepts the URL to which the web browser is navigating to determine whether it is a phone URL generated by clicking on one of the highlighted telephone numbers on the webpage. If Event Handler 1062 determines that it is a phone URL, WebDial Plugin 1060 extracts the number string from the phone URL and sends the number string to IP Telephony program 1070 via External Application Interface 1072. The number string which makes up the highlighted telephone number may be stripped of any separator characters, such as spaces, parentheses, brackets, etc., before passing it on; however, this stripping routine is not necessary, and the present embodiment does not have such a stripping routine because the IP telephony program 1070 may use some of these separator characters to properly interpret the telephone number it represents. In addition, the number string is provided to address book 1074 and Ink log 1076 as data which is accessed in accordance with the present embodiment of the invention.

The appearance of the phone number when clicked is determined by parameters that are stored in cascade style sheet 1078. A user is permitted to define features, such as the color of the number or whether the number is bold, highlighted, underlined, etc., whenever the number is clicked.

Although FIGS. 10A-10B show an Internet Explorer/Windows implementation of the present embodiment, the contemplated embodiment of the present invention is by no means limited to either the Microsoft Windows operating system or the Internet Explorer web browser. Other web and/or non-web browsers, such as Netscape Navigator, Apple's Safari, Mozilla, Opera, etc., may be used with the present preferred embodiment.

In fact, although the present embodiment is described in the context of either the Microsoft Windows operating system or one of the Microsoft software applications, the contemplated embodiments may be implemented in a system running any operating system, such as the Apple Mac OS, the Linux operating system, or any of the flavors of UNIX. In other words, the present invention is platform-independent.

Figure 10C:
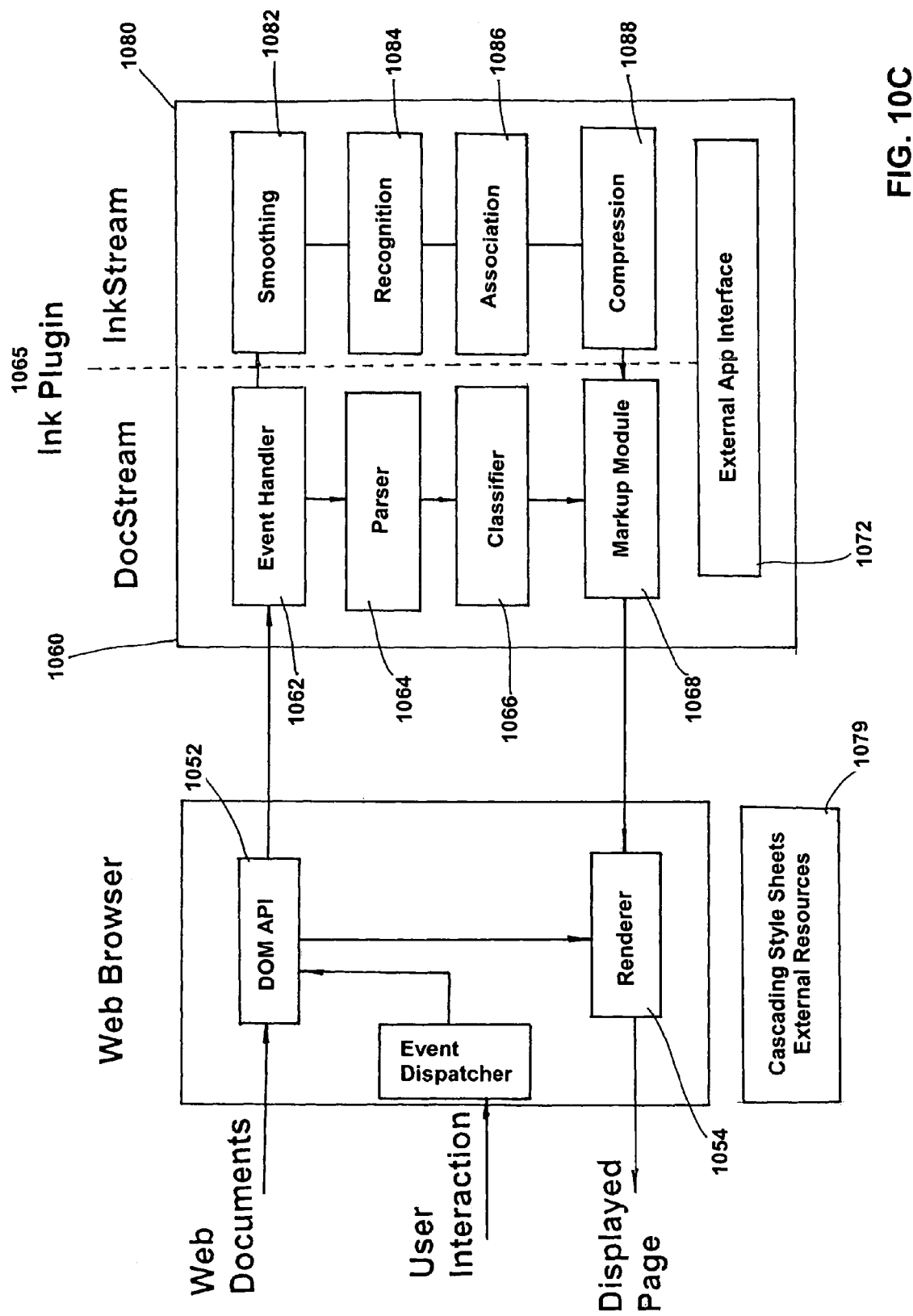
FIG. 10C is a schematic block diagram showing a browser helper object (BHO) that is initiated at each instant of a web browser in accordance with the present invention.

FIG. 10C is a schematic block diagram showing a browser helper object (BHO) that is initiated at each instant of a web browser. As shown in FIG. 10C, the BHO comprises Ink-Plugin 1065, which includes InkStream 1080 and DocStream 1060 (i.e., Webdial Plugin) of FIG. 10B. Ink-Plugin 1065 provides two functionalities. The first is the web-dial capability, which is shown in the DocStream 1060 portion of Ink-Plugin 1065 and described previously with respect to FIG. 10B. In accordance with the present embodiment, DocStream 1060 looks at the html page that is downloaded and detects the phone numbers that are on this page.

The InkStream 1080 module captures ink strokes that are performed by a user. Smoothing module 1082 is used to remove the rough edges of the handwriting process. In the preferred embodiment of the present invention, the ink coordinates are smoothed in real time using a hysteresis filter to reduce the jitter introduced by a stylus or a mouse. See R. Duda and P. Hart, PATTERN CLASSIFICATION AND SCENE ANALYSIS, John Wiley & Sons, NY, 1973, for an exemplary hysteresis filter with which to perform the smoothing. Such a non-linear filter also helps in smoothing out the jaggedness associated with writing notes.

Recognition module 1084 is used to perform handwriting recognition of characters/numbers or to recognize gestures for commonly used functions, such as printing or go "back" to the previous page, etc., as described previously.

Association module 1086 is used to associate ink with respect to certain anchor points on the web documents, as described previously. In accordance with the preferred embodiment the anchor points are the phone numbers that are detected by DocStream module 1060.

Compression module 1088 is provided so as permit ink data to be saved in a compressed format. Here, compression is preformed in accordance with the polygonal compression method, for example, which is described in K. Wall and P. Danielsson, "A fast sequential method for polygonal approximation of digitized curves", in *Proc. Of Computer Vision, Graphics and Image Processing*, Vol. 28, 1984, pages 220-227. As stated previously, this compression involves finding the longest allowable segment by merging points one after another after the initial one, until a test criterion is no longer satisfied, as shown in FIG. 5.

Once the ink is captured, it may be placed into Ink log 1076 (see FIG. 10B) or used to annotate a web page, such as medical images, etc. It is also possible to stream the ink to a remote place for real-time exchange as an ink-chat etc. The capture of ink in accordance with the present embodiment is device independent. For example, in devices such as a PDA and tablet pc, a stylus is provided for drawing directly on the screen. In each case, device specific application programming interfaces (API's) may be used to capture and render ink on the screen. Here, device independent parameters permit manipulation of the ink once they are captured, such as efficiently indexing and storing the ink to enable ease of retrieval. It would then be possible to use an indexing algorithm on any of these devices, as would be known appreciated by a person skilled in the art. The Cascading Style Sheets module 1079 permits a user to define the ink characteristics, such as color, thickness, etc.

Figure 11A:
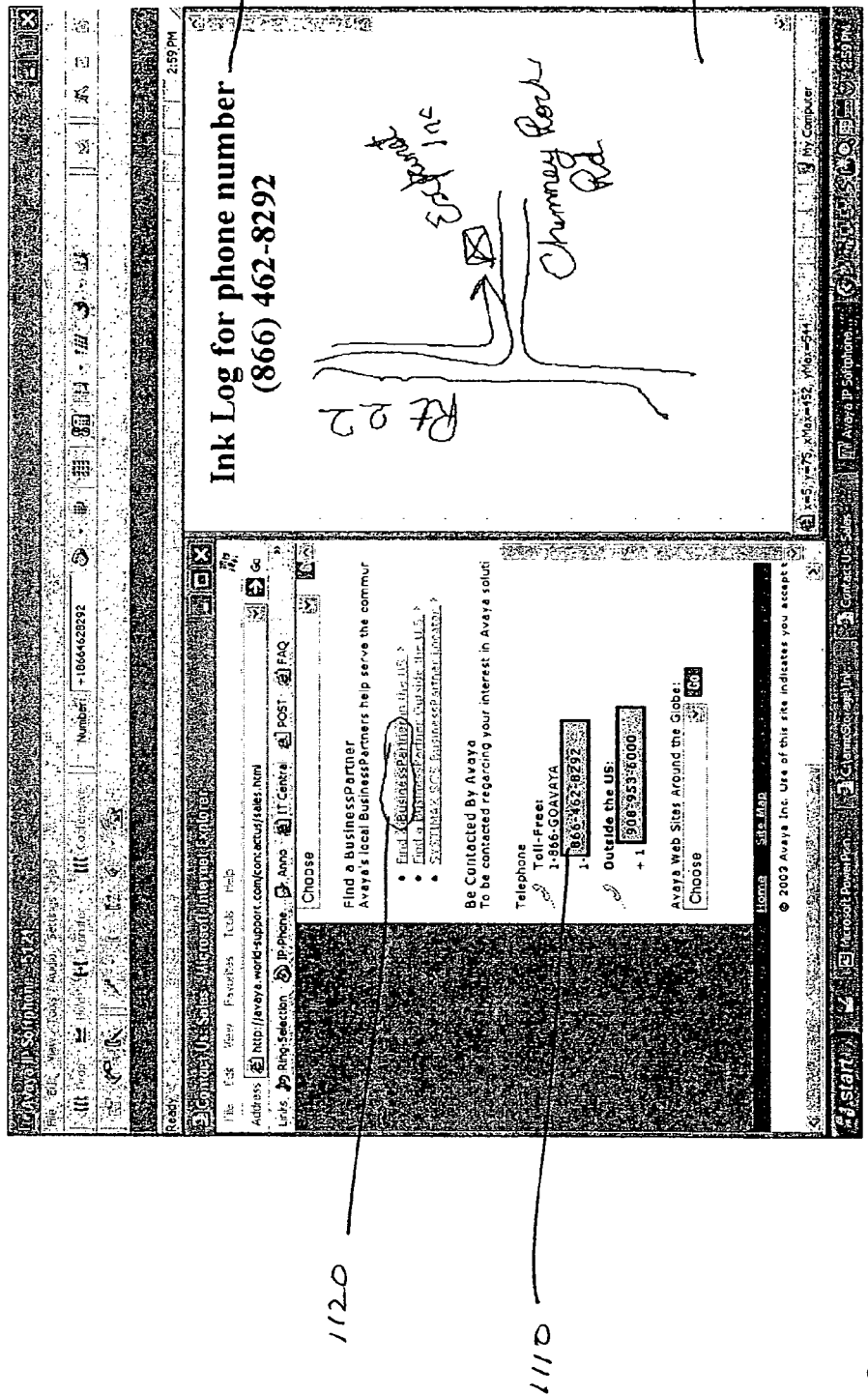
Figure 11B:
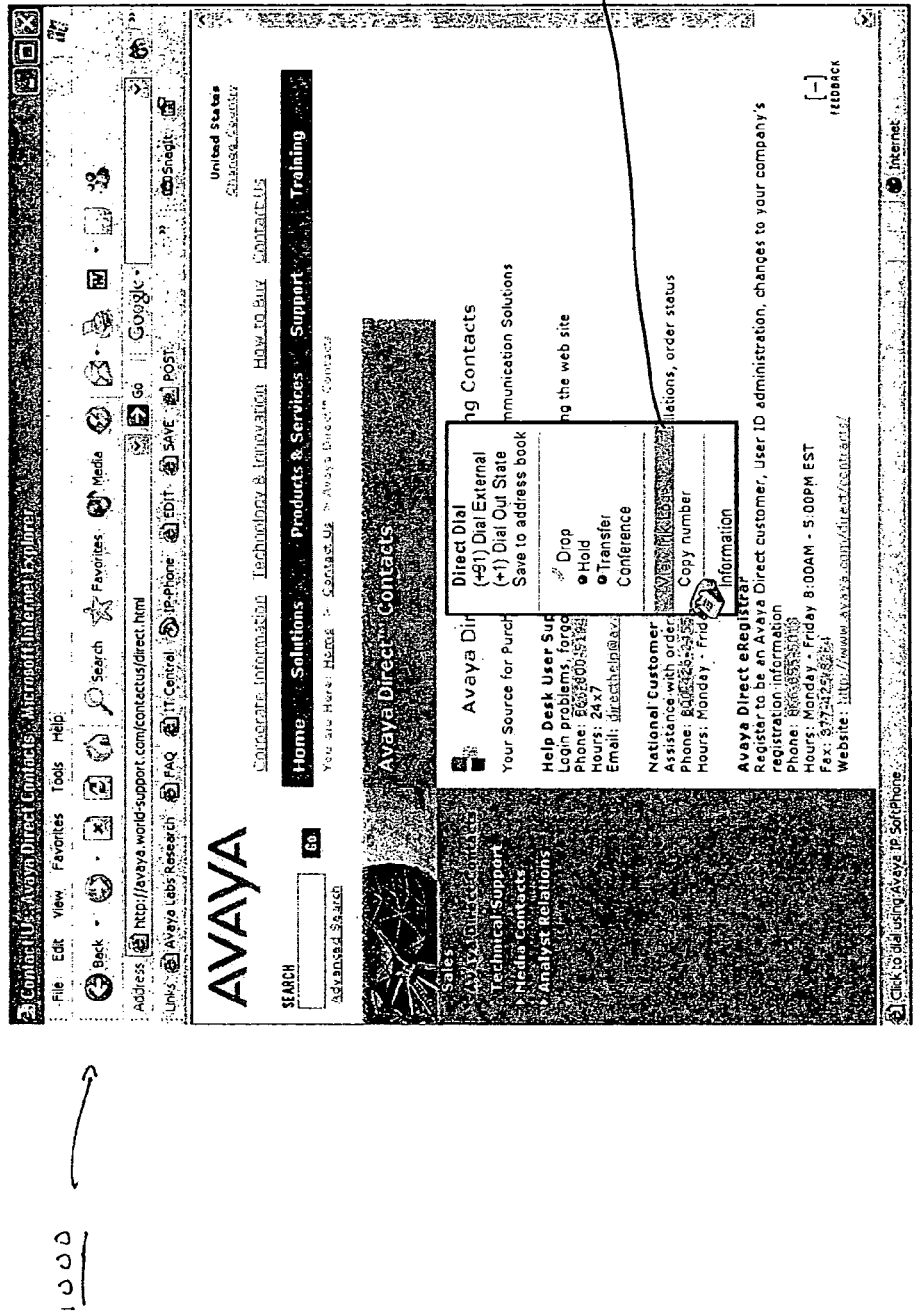

FIGS. 11A-11C are exemplary illustrations of detecting, capturing, storing, streaming and associating ink with particular information in accordance with the invention. Here, ink log 1076 (FIG. 10B) is used to store handwritten notes that are generated during a phone call via the web dial functionality described above. With reference to FIG. 11A, whenever a call is made or received via a regular telephone or an IP Softphone 1070 (FIG. 10B) residing on a pc, the number that is being dialed 1110 or that the call is being received from is used in a search which is performed to determine whether a file associated with this number 1110 exists within the ink log 1076. It is also possible to select a specific area, i.e., area 1120, and perform the search to determine whether there is a file associated with the specific entity for the phone number 1110.

If a file associated with the called or dialed number exists, then the file is retrieved and all prior ink notes (e.g., the notes and map shown in window 1130) that were associated with this number including their time stamps are displayed in a window 1130 that is opened. On the other hand, if a file corresponding to the called or dialed number is not present in the ink log, then a new file is created along with an associated blank window, whereby the user can begin "inking" into this file. In this manner, digital "post-its" are created, and the post-it notes are always associated with the called or dialed number.

Alternatively, a user may highlight a phone number and view the InkLog for the particular number. This is best appreciated with reference to FIG. 11B. Here, a pull down menu is shown with the View Ink Log 1140 category highlighted. Upon a user selecting the View Ink Log category, the InkLog is accessed and all notes, drawings, etc. that a user generated in all previous calls that where either made to this number or calls received from this number are displayed, as shown in FIG. 11A, for example.

As explained above, a right-click on the mouse button is clicked to view the InkLog. This creates a url, such as http:\\inklog_phonenumber. This is captured by the BHO in order to display the ink files associated with the number. It will be appreciated by one skilled in the art that any other application could also retrieve the same url, i.e., http:\\inkog_phonenumber. In this manner, a url is created when a call is made from or is received by the regular telephone. The IP SoftPhone 1070 (FIG. 10B) component that resides on the computer is always alerted of any outgoing or incoming calls. When this occurs, the IP SoftPhone 1070 performs a url request using the corresponding phone number. As a result, the IP SoftPhone 1070 will always be permitted to open an ink-log from either a web-page click or even if someone dials out of the phone or if a phone called is received.

In another aspect of the present embodiment, multiple users are permitted to communicate not only by voice but also simultaneously by writing on a "whiteboard", i.e., a new screen that is opened for inking. Here, communication is established between two parties, where voice, document and ink are all enabled simultaneously. This is appreciated when reference is had to FIG. 11B. Here, the pull down menu 1160 on the screen is shown when the user has clicked the right mouse button on a highlighted number 1170. In accordance with the invention, the person associated with the highlighted number 1170 is permitted to see annotations drawn by the user in real-time. This is possible due to the presence of InkStream 1080 of the Ink Plugin 1065, as described with respect to FIG. 10C. The ink that is generated by the user is available for streaming to the second user at a remote ink enabled location.

Figure 12:
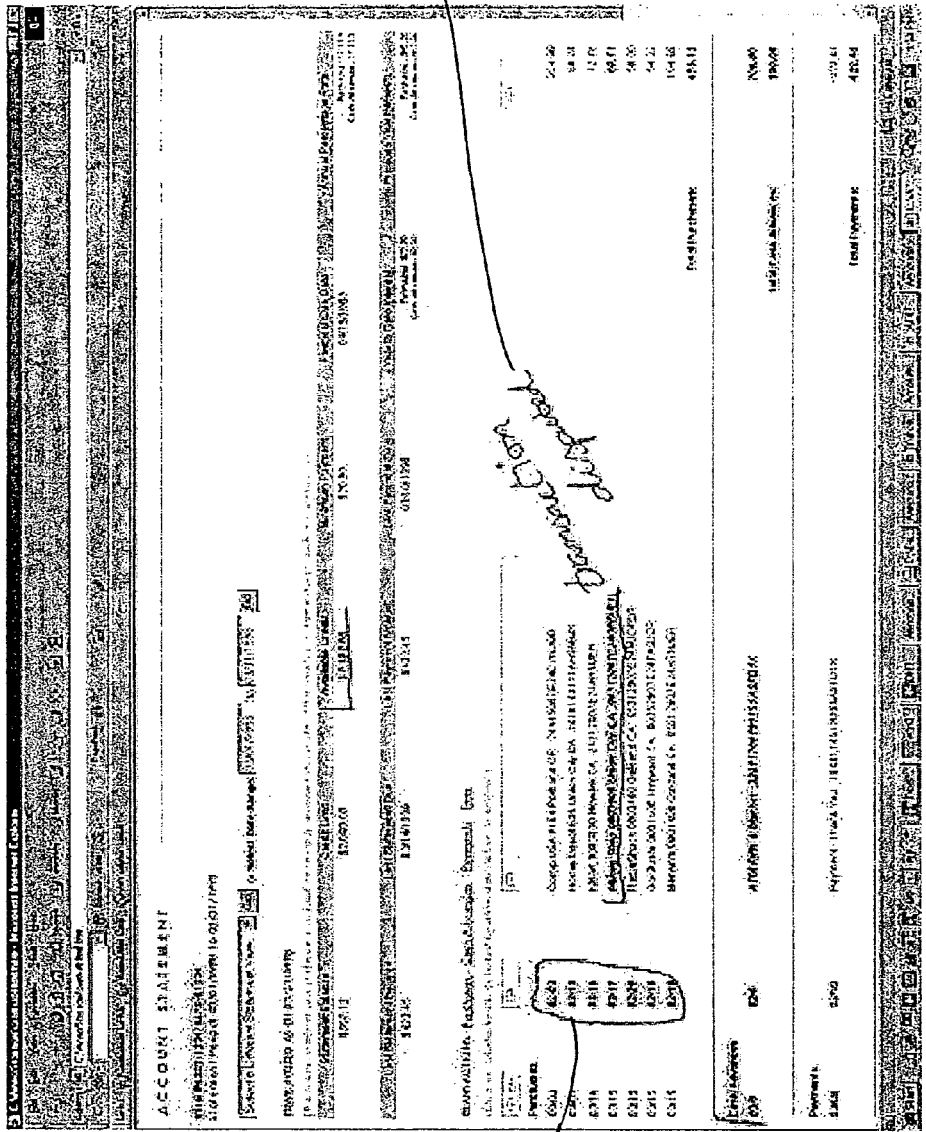
FIG. 12 is an exemplary screen that is presented to a user upon initiating the collaborate function shown in FIG. 11C.

With additional reference to FIG. 11C, upon selecting "Collaborate", a screen such as the account statement screen shown in FIG. 12 will appear. This is one example of a situation in which a customer brings up a bill for dispute, and annotates the bill with the circle 1210 and/or text 1220 to indicate that the disputed portions of the bill. These annotations are seen by an agent on the remote end.

In essence, ink information is captured and streamed from one end to another. In addition, ink can be shared between the two parties involved in the phone call in real-time. This is based on the premise that both the parties involved in the call are ink enabled. As a result, once the call has been made, ink drawn by one user is streamed to the other and vice-versa. The transmission is stopped if the call ends. In other embodiments, ink sharing may be performed in contact center applications, where a user can circle or ink, parts of the bill to explain it more visually to the contact center agent or vice-versa.

The present invention permits the creation of multimedia calls, which permits multiple parties to communicate not only by voice but also simultaneously by writing on a whiteboard. In addition, the ink drawn during the session is stored and associated with the phone number in the ink log 1076 (FIG. 10B) to permit retrieval of the past history to show notes that were written when a previous call was made between the same numbers.

Figure 13:
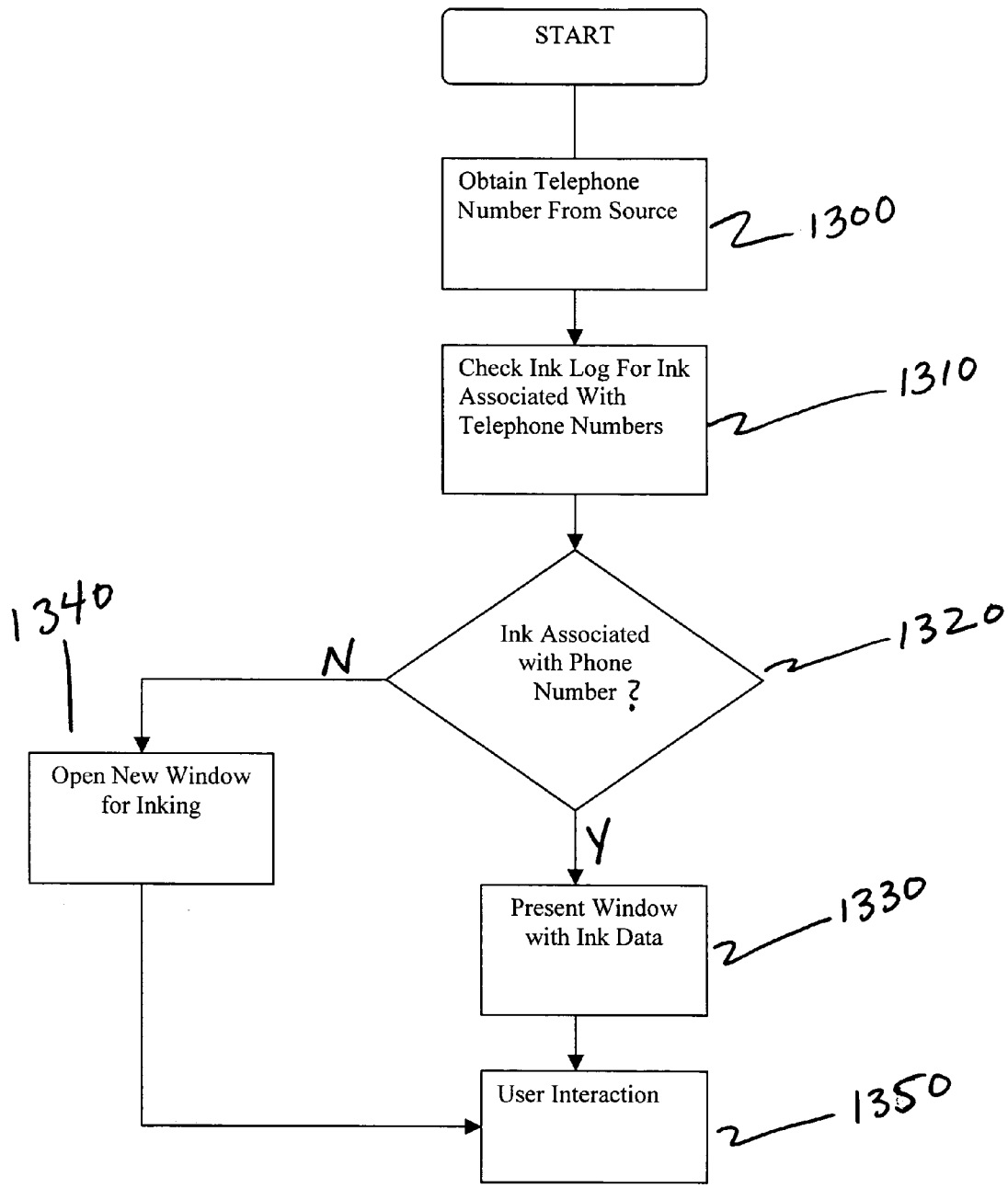
FIG. 13 is a flow chart illustrating the steps of the method for capturing, storing and associating ink with elements on documents using digital ink inking in accordance with the invention.

FIG. 13 is a flow chart illustrating the steps of the method of the present preferred embodiment. Digital data representing telephone numbers are acquired from a predetermined source, such as an IP SoftPhone or a web document, as indicated in step 1300. When the source for the phone number is an IP SoftPhone, it is the SoftPhone 1070 component (FIG. 10B) that resides on the computer. Here, the IP SoftPhone 1070 is always alerted of any outgoing or incoming calls. When this occurs, the IP SoftPhone 1070 performs a url request using the corresponding phone number. As a result, the IP SoftPhone 1070 will always be permitted to open an ink log from either a web-page click or even if someone dials out of the phone or if a phone called is received.

In the case where the telephone number is obtained from a web document, the number is highlighted in the manner described previously. Here, the user may click on one such highlighted telephone number to perform some sort of action upon it, e.g., initiate a telephone call, store the telephone number in an address book, or place it in temporary storage for immediate retrieval. Hence, parser 1064 shown in FIGS. 10B-10C would parse the DOM of the downloaded document to find any instances of telephone numbers. Here, the parser 1064 uses regular expression parsing rules which detects the various formats that the information can possess within the computer document. For example, North American based telephone numbers could be parsed into three groups comprised of a first group of three digits, a second group of three digits, and a third group of four digits. Once parser 1064 has completed its task, the results, if any, are output to classifier 1066.

A check of the ink log is then performed to locate all ink that is stored in the ink log, as indicated in step 1310. A check is then performed to determine whether the located ink data are associated with the telephone number obtained from the IP SoftPhone 1070, as indicated in step 1320. In one embodiment, the association of ink with telephone numbers is established.

If the located ink data are associated with the telephone number, then a window is presented with associated ink data, as indicated in step 1330. If on the other hand, there is no ink data associated with the telephone number, then a new window is established, as indicated in step 1340. At this point, ink interaction may be performed in accordance with the contemplated embodiments, as indicated in step 1350.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for capturing, storing, streaming and associating ink in a predetermined source using digital ink, comprising the steps of:
   obtaining digital data from the predetermined source;
   accessing an InkLog to locate all digital ink data that is stored in the InkLog;
   determining whether any located digital ink data are associated with the digital data from the predetermined source; and
   opening a graphical user interface window for inking, said window including the digital data from the predetermined source and the located digital ink data if the located digital ink data are associated with the digital data from the predetermined source.

2. The method of claim 1, further comprising the step of:
   opening a new graphical user interface window if ink data associated with the digital data are not located in the InkLog.

3. The method of claim 2, wherein communication is established between multiple parties.

4. The method of claim 3, wherein multiple users communicate simultaneously by writing on a new screen that is opened for inking upon establishment of the communication.

5. The method of claim 4, wherein voice, documents and ink are enabled simultaneously during the communication between the multiple users.

6. The method of claim 4, wherein ink generated at one location is available for streaming to a second, remote ink enabled location.

7. The method of claim 6, wherein ink streaming is terminated if communication between the multiple parties is terminated.

8. The method of claim 1, wherein the digital data is a telephone number.

9. The method of claim 1, wherein the predetermined source is at least one of an IP SoftPhone or a web document.

10. The method of claim 9, wherein the IP SoftPhone alerted with respect to an occurrence of outgoing or incoming calls.

11. The method of claim 1, further comprising the step of:
    performing a request for a url via the IP SoftPhone based on the digital data.

12. The method of claim 11, wherein the IP SoftPhone is operable to open the InkLog from either a web-page click or a call received or placed from the IP SoftPhone or a regular phone.

13. The method of claim 12, wherein a number that is being dialed or that the call is being received from is used in a search which is performed to determine whether a file associated with the number exists within the file associated with the InkLog.

14. The method of claim 13, wherein if a file associated with the called or dialed number exists, the file associated with the InkLog is retrieved and all prior ink notes associated with the number are displayed in a window that is opened.

15. The method of claim 14, wherein the file associated with the InkLog includes time stamps of the prior ink notes.

16. The method of claim 13, wherein if a file corresponding to the called or dialed number is not present in the file associated with the InkLog, a new file is created along with an associated blank window which is configured to permit inking into the new file.

17. The method of claim 1, wherein a file associated with the InkLog stores handwritten notes that are generated during a phone call via an IP SoftPhone.

18. The method of claim 1, further comprising the step of:
    highlighting a phone number and viewing a file associated with the InkLog for the particular number;
    wherein a pull down menu with a View InkLog category is highlighted for user access.

19. The method of claim 18, wherein upon selection of the View Inklog category, the InkLog is accessed and all ink notes which were generated in all previous calls made to a specific number or previous calls received from the specific number are displayed.

20. The method of claim 1, further comprising the step of:
    performing a right-click on a mouse button to view the InkLog.

21. The method of claim 20, wherein said right-click creates a url.

22. The method of claim 21, further comprising the step of capturing the url by way of a Browser Helper Object (BHO) so as to display files associated with InkLogs associated with a phone number.

23. The method of claim 1, wherein said accessing step comprises automatically parsing the predetermined source to any instance of a telephone number using a Dynamic Linked Library (DLL).

24. The method of claim 23, wherein the DLL is at least one of a Browser Helper Object (BHO), a Component Object Model (COM) Plug-in, and a COM Add-in.

25. The method of claim 23, wherein the DLL comprises an Event Handler which detects events generated by an Object Model of a web page.

26. The method of claim 1, wherein the method is implemented on at least one of a desktop computer, a laptop computer, a Personal Digital Assistant (PDA) or other hand-held computer, a cellular telephone, and any device configured to run a markup language document browser.

* * * * *